United States Patent
Maisonville

[11] 3,939,397
[45] Feb. 17, 1976

[54] METHOD AND APPARATUS FOR DETERMINING THE TIMING ANGLE IN INTERNAL COMBUSTION ENGINES

[75] Inventor: Richard C. Maisonville, Detroit, Mich.

[73] Assignee: Scans Associates, Inc., Livonia, Mich.

[22] Filed: June 1, 1973

[21] Appl. No.: 365,839

Related U.S. Application Data

[63] Continuation-in-part of Ser. No. 200,974, Nov. 22, 1971, Pat. No. 3,763,420.

[52] U.S. Cl............................ 324/16 T; 324/83 D
[51] Int. Cl.$^2$........................................ G01R 29/00
[58] Field of Search......... 324/15, 16 R, 16 T, 83 D

[56] References Cited
UNITED STATES PATENTS

| | | | |
|---|---|---|---|
| 3,454,871 | 7/1969 | Nolting............................ | 324/16 T |
| 3,697,865 | 10/1972 | Smith............................... | 324/16 T |
| 3,753,082 | 8/1973 | Crawford......................... | 324/16 T |
| 3,763,420 | 10/1973 | Maisonville..................... | 324/16 T |

*Primary Examiner*—John S. Heyman
*Attorney, Agent, or Firm*—D. Edward Dolgorukov

[57] ABSTRACT

This application discloses a method and apparatus for measuring and/or adjusting the timing angle of internal combustion engines. The method of measuring the timing angle comprises the steps of running the engine and producing voltage pulsations of uniform time frequency against which are simultaneously taken measurements of two values: first, the measurements of engine speed by counting the number of pulsations for one full and precise revolution of the engine from top dead center to top dead center of one selected cylinder, and simultaneously counting the number of pulsations from the moment the spark plug of the selected cylinder fires to the top dead center (for advanced firing), or from the top dead center to the moment of firing of the spark plug (for retarded firing). Counting two of such values enables the testing personnel to express the timing angle in degrees and to have the RPM of the engine at the time of testing, neither of which would be available if only one of such two values was measured. The disclosed test apparatus also provides a mechanism responsive to such measurements, which mechanism gives a readout of the revealed timing angle and compares it with the set range of timing angles, and a servo-mechanism which automatically adjusts the obtained timing angle to the desired value within such set angle. In one of its aspects, the application discloses a test stand which may be conveniently used for tests, and a conveyor connecting into a single system a plurality of such stands to test the engines, particularly but not exclusively automobile engines under production conditions, as the system may also be used to test engines when operating in an automobile.

Also disclosed is a modification of the apparatus mentioned above, whereby said apparatus can be used to find the timing angle of each cylinder of the engine being tested, add the values so obtained, and divide the value so obtained by the number of cylinders in the engine, thereby finding the true average timing angle over all of the cylinders of the engine.

30 Claims, 20 Drawing Figures

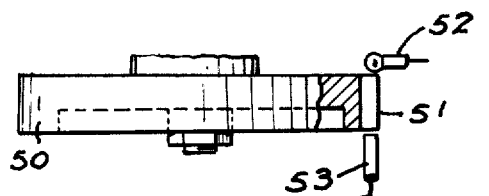
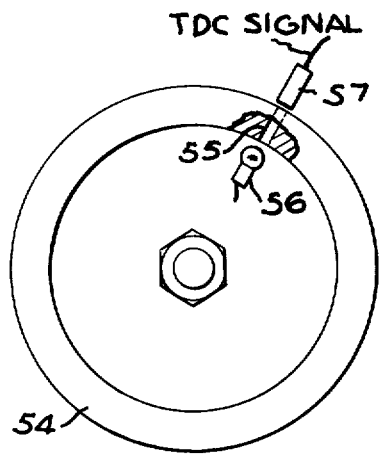
FIG. 9
FIG. 10
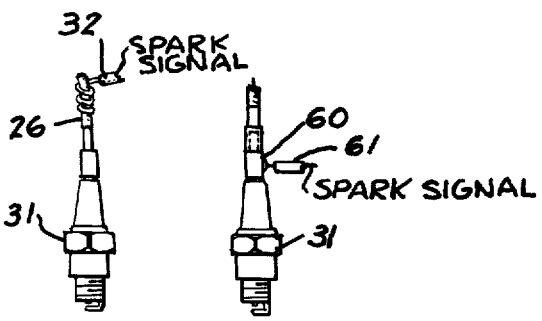
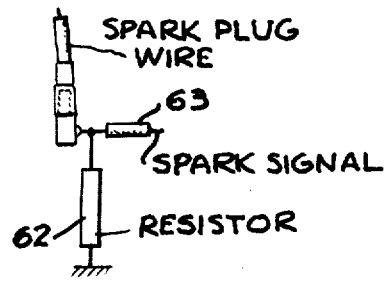
FIG. 13  FIG. 11
FIG. 12
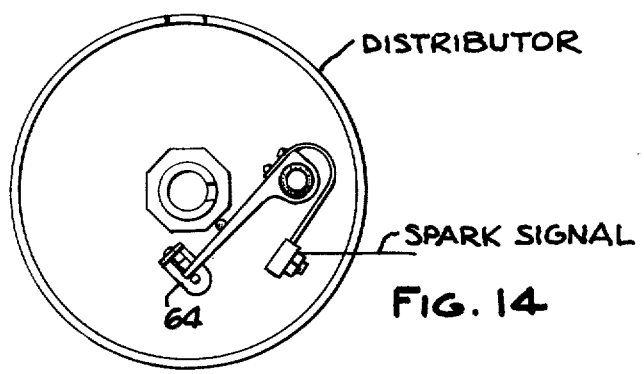
FIG. 14

METHOD AND APPARATUS FOR DETERMINING THE TIMING ANGLE IN INTERNAL COMBUSTION ENGINES

This application is a continuation-in-part of my co-pending application Ser. No. 200,974, entitled now U.S. Pat. No. 3,763,420, "Method and Apparatus for Testing Internal Combustion Engines", filed Nov. 22, 1971.

The invention disclosed herein relates to internal combustion engines, such as automobile engines, and more particularly to an improved method and apparatus for measuring and/or adjusting the timing angle of the engine, i.e., the angle of occurrence of igniting spark in the cylinder of the engine with respect to the top dead center position of the pistons of the respective cylinders. In one of its aspects, the invention relates to providing an improved automatic testing system, such as a conveyor serving a plurality of test stands, with each of said stands adapted to receive a test engine and to operate such engine in a manner to reveal the time of occurrence of the ignition spark with respect to the top dead center position of the engine piston, and to set or adjust such time, usually referred to as "timing angle", at a predetermined or desired point.

A patent application of Richard L. Smith and Dennis F. Sauerbrey, now U.S. Pat. No. 3,697,865, discloses a method and apparatus for adjusting the timing angle with the use of encoder producing fast pulsations, such as 3600 pulsations per one revolution of the engine, or 10 pulsations per degree. The basis of that system is counting, in effect, degrees. By such count, this system gives timing angle and brings the desired result.

Such system produces good results and is particularly adaptable to certain conditions. However, it cannot be economically used under all conditions. Encoder is a rather expensive device and, in addition, it is very fragile. It is very sensitive to shocks and can become unusable after receiving relatively mild shocks. Furthermore, the encoder has to be connected to the engine in a test system. It cannot be easily connected to the engine of a vehicle in such condition as in the parking lot.

One of the objects of the present invention is to devise a method and apparatus for measuring and/or adjusting the timing angle of the engine without requiring the use of an encoder.

Another object of the present invention is to provide an improved test system to measure the timing angle of an internal combustion engine irrespective of whether or not the engine is in a test stand or is operating in a motor vehicle or is installed for test in any other suitable condition.

Another object of the present invention is to provide an improved engine testing system to have the engine reveal its timing angle, which system can be conveniently used in repair garages with the limitations of equipment and personnel present in such garages.

Another object of the invention is to provide an improved test stand adapted to receive and to operate a test engine to reveal its timing angle, but without producing actual ignition in the cylinders thereof, thus eliminating the necessity of operating the engine on gasoline or on any inflammable gas, such as butane gas, as well as eliminating the inconveniences and complications connected therewith.

Another object of the invention is to provide an improved testing system for automobile engines, said system including a plurality of test stands receiving test engines from loading stations to have each engine securely installed in a respective stand for the test, to run the engine in a manner to reveal correctly its timing angle, to adjust the distributor automatically to produce a desired timing angle, to remove the test engine from the respective test stand, and to deliver the tested engine to the unloading station.

A further object of the invention is to provide an improved engine test stand adapted to receive and to run the test engine to reveal its timing angle, all without requiring cooling the engine with water or removing exhaust gases.

A still further object of the invention is to provide an improved engine testing system adapted to run the engine to reveal its timing angle, to release its distributor fixing means, such as distributor hold down bolt, to adjust the distributor to produce a predetermined timing angle, and thereupon to retighten said fixing means.

A still further object of the present invention is to provide an improved engine testing system of the foregoing character, and including a spark plug operated by the ignition system of the engine, as related to a selected cylinder, means to produce pulsations of uniform time frequency, means to count simultaneously the number of pulsations so produced for one complete revolution of the engine and, therefore, also for one degree of engine rotation, and at the same time count the number of such uniform pulsations that take place from the moment the spark plug of the selected cylinder fires until the moment the piston of the selected cylinder reaches the top dead center. The timing angle is then obtained by dividing the time of the last value by the time for one degree of engine rotation.

It is a further object of the invention to provide an improved timing angle measuring and/or adjusting system in which the uniform pulsations are produced by a crystal oscillator of known and uniform time frequency.

It is a further object of the invention to provide an improved timing angle measuring and/or adjusting system in which the signal is received from a magnetic pickup activated by the harmonic damper and is given at the beginning and at the end of one revolution of the engine at top dead center.

A still further object of the present invention is to provide a second signal at the moment the spark plug of the selected cylinder fires.

A still further object of the present invention is to pass the two signals through a signal conditioner which converts each of the signals into a low voltage pulse compatible with the system.

A still further object of the present invention is to provide an improved method and apparatus for measuring and/or adjusting timing angle of internal combustion engines, in which method and apparatus there is taken simultaneously a count of two values with respect to the same uniform time pulsations. First, the count of pulsations per one full and precise revolution of the engine, which gives also the number of pulsations per one degree of engine rotation; and, second, the number of pulsations from the moment the spark plug in the selected cylinder fires to the moment when the piston in the selected cylinder reaches the top dead center (for advanced firing). It can be understood that having received the values for both of these counts, the timing angle may be easily computed. On the other hand, if only one system of value is counted, the timing angle is not obtainable since if number of pulsations in the timing angle is obtained, there is no way of expressing it with relation to the degrees of rotation of the engine since the value of the pulsations in the timing angle not being expressed with relation to rotation of the engine is meaningless.

A still further object of the present invention is to provide an improved method and apparatus for measuring and adjusting the timing angle of an internal combustion engine which also gives the values for RPM of the engine during the time the measurements are taken.

A still further object of the present invention is to produce an improved method and apparatus for measuring and/or adjusting the timing angle of internal combustion engines, which timing angle measurement can be used to adjust the distributor and to compare the obtained results with the high and the low limits of the established range of such angle.

A still further object of the invention is to provide an improved method and apparatus for measuring and/or adjusting the timing angle of the engine, in which there is provided a servo-mechanism to adjust the distributor.

A still further object of the present invention is to provide an improved method and apparatus for measuring and/or adjusting the timing angle of internal combustion engines wherein the necessary mathematical calculations are performed with the use of binary mathematics.

A further object of the present invention is to provide an improved method and apparatus for measuring and/or adjusting the true average timing angle of an internal combustion engine.

Another object of the present invention is to provide an improved method and apparatus for measuring and/or adjusting both, the timing angle of one selected cylinder in an internal combustion engine, or the true average timing angle over all the cylinders of an internal combustion engine.

It is an added object of the present invention to provide an improved test system of the above nature which is relatively simple in construction, dependable in operation, is operated with the minimum of personnel, and is relatively easy to repair and service.

Further objects and advantages of this invention will be apparent from the following description and appended claims, reference being had to the accompanying drawings forming a part of this specification, wherein like reference characters designate corresponding parts in the several views.

Figure 8:
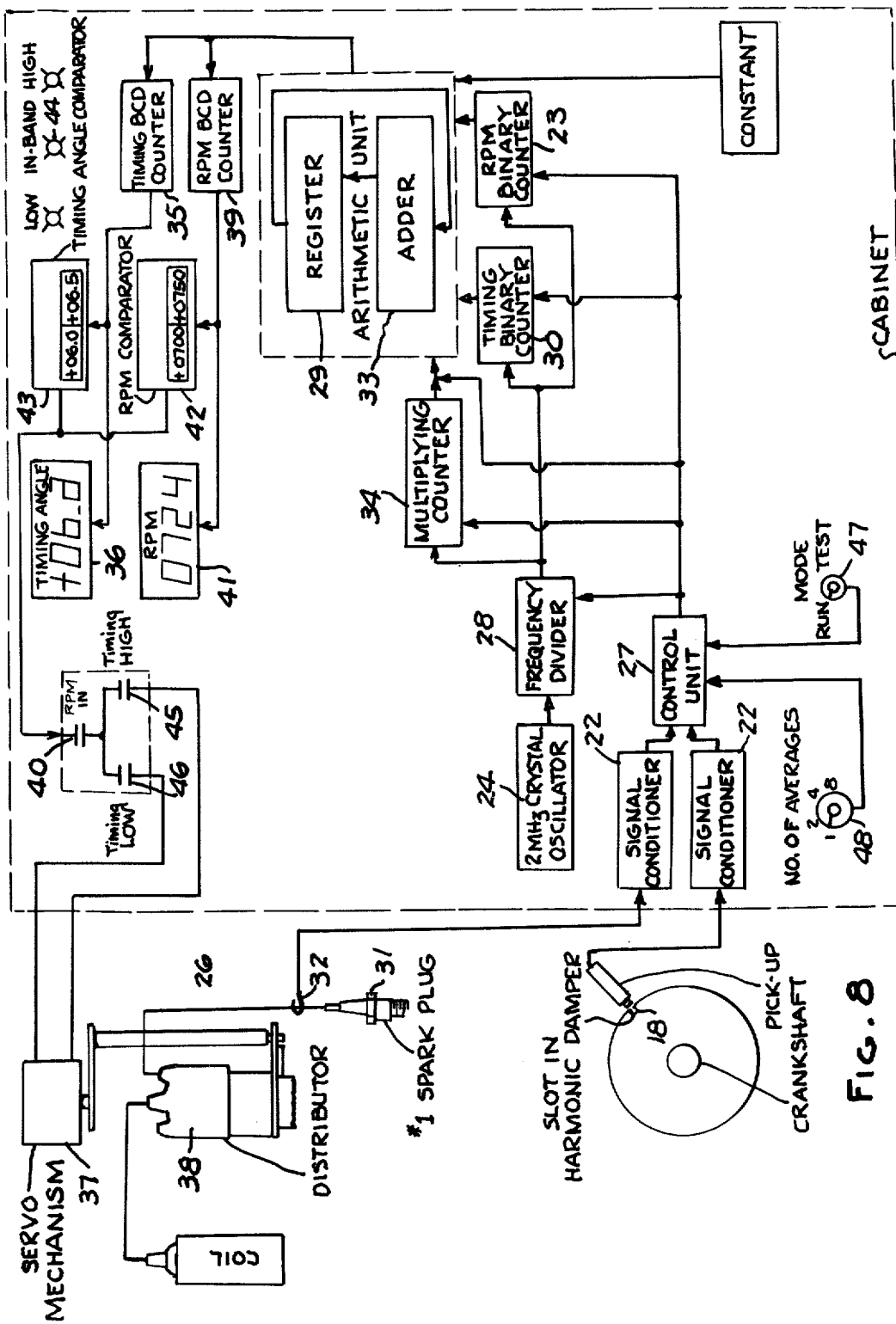

FIG. 8 is a diagrammatic view of the complete system, including the apparatus necessary to compute the timing angle and RPM of the engine, to compare the timing angle obtained with a predetermined range of timing angles, for the predetermined range of RPM and automatically adjust the distributor to produce a desired value of timing angle, and further including means to internally test the system to insure its correct operation.

FIG. 9 is a modification of means for producing the top dead center signal by using a slot in the harmonic damper.

FIG. 10 is still another modification of means for producing a top dead center signal by using a hole in the harmonic damper.

FIG. 11 shows another method of picking up a signal when the spark plug fires by a non-inductive means.

FIG. 12 shows a method of picking up said spark signal without the use of a spark plug.

FIG. 13 shows an inductive method of picking up a spark signal.

FIG. 14 shows a method whereby the spark signal can be picked up from the distributor of the internal combustion engine.

Figure 15:
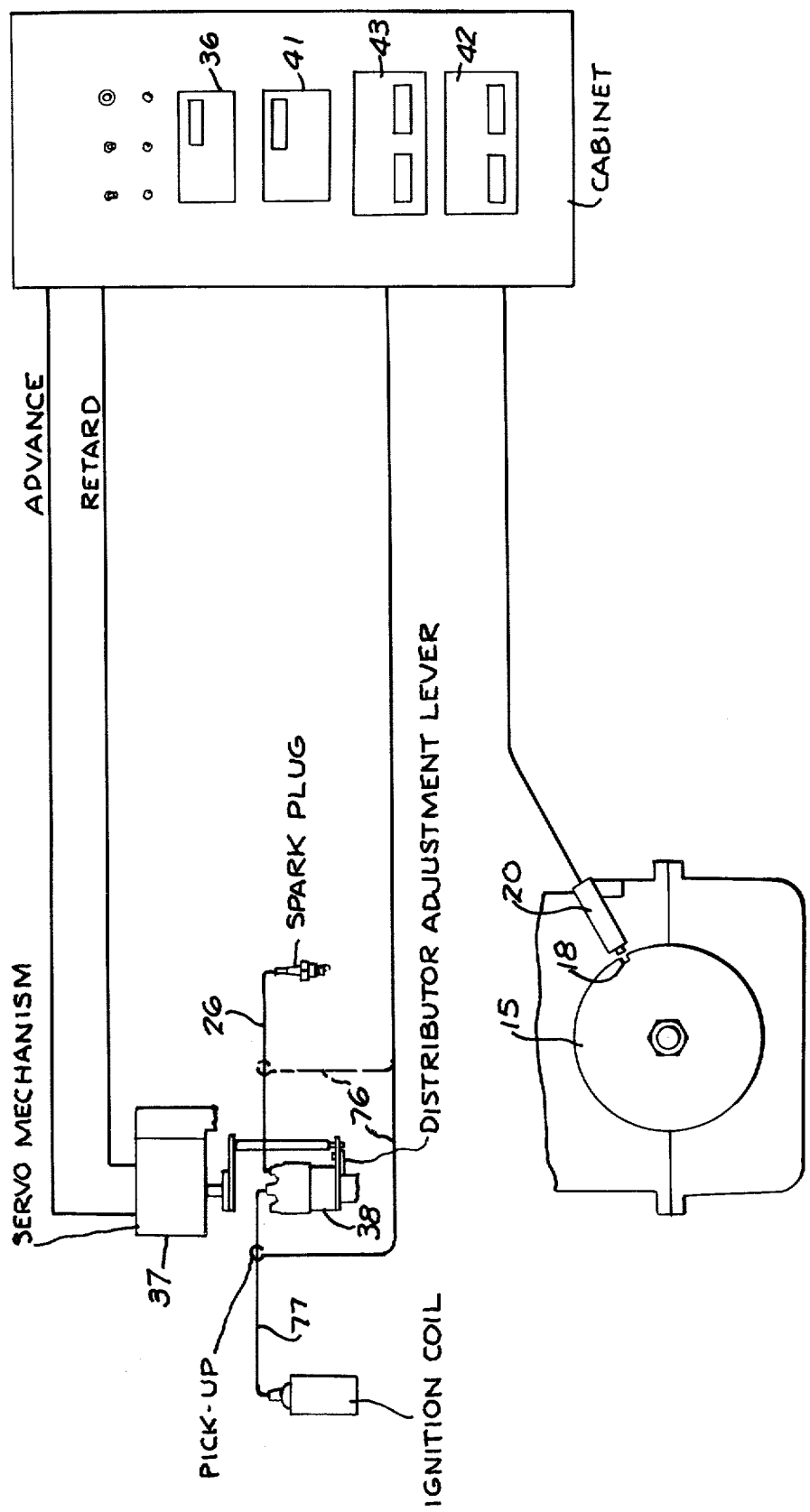

FIG. 15 is a diagram showing one system as it may be used on an engine outside a test stand to determine either the timing angle of one selected cylinder or the true average timing angle over all the cylinders of said engine.

Figure 16:
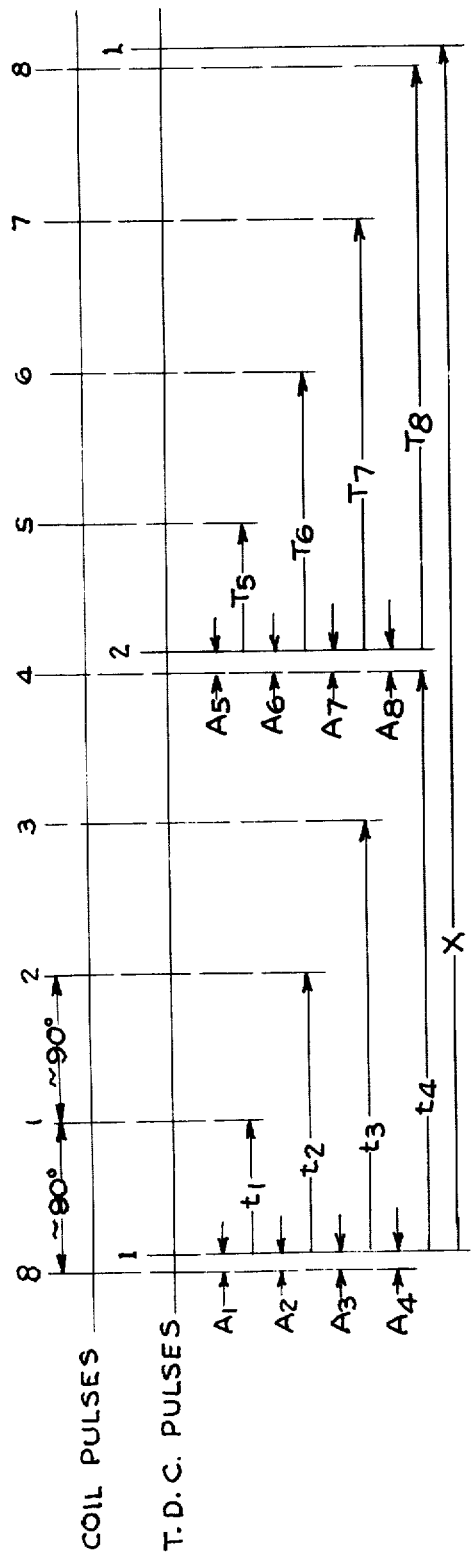

FIG. 16 is a graph illustrating the operation of the present invention in calculating the true average timing angle of an internal combustion engine running in the advanced ignition condition.

Figure 17:
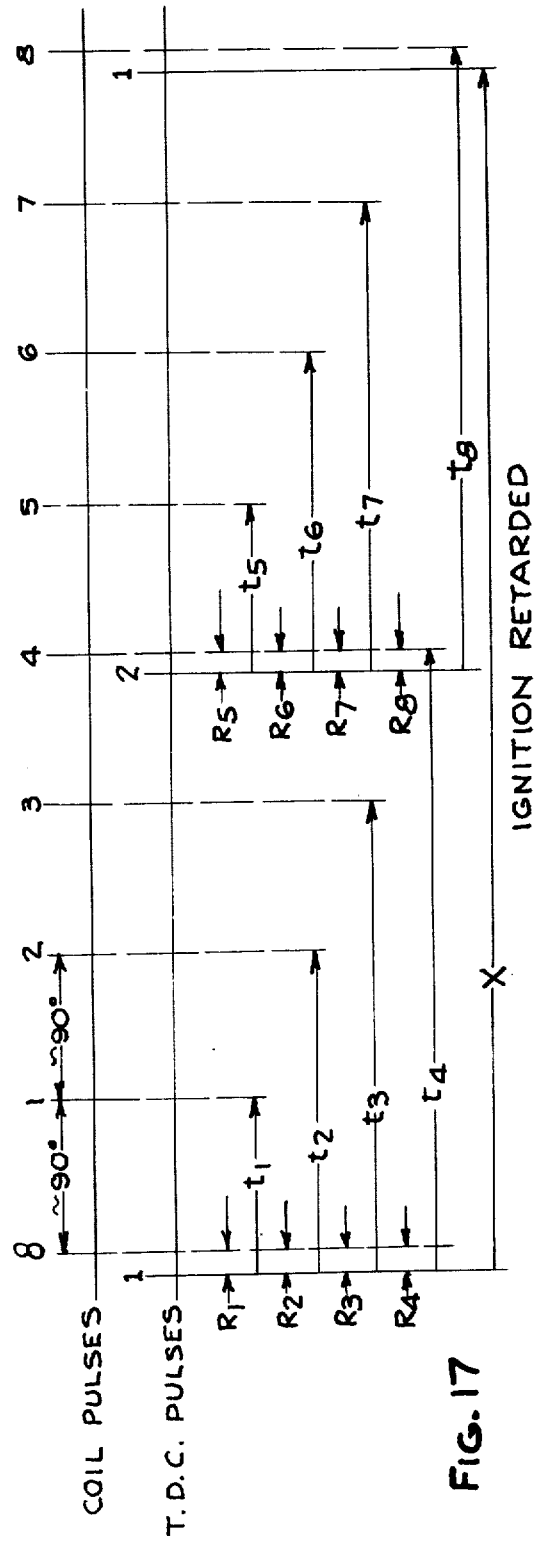

FIG. 17 is a graph illustrating the operation of the present invention in calculating the true average timing angle of an internal combustion engine running in the retarded ignition condition.

Figure 18:
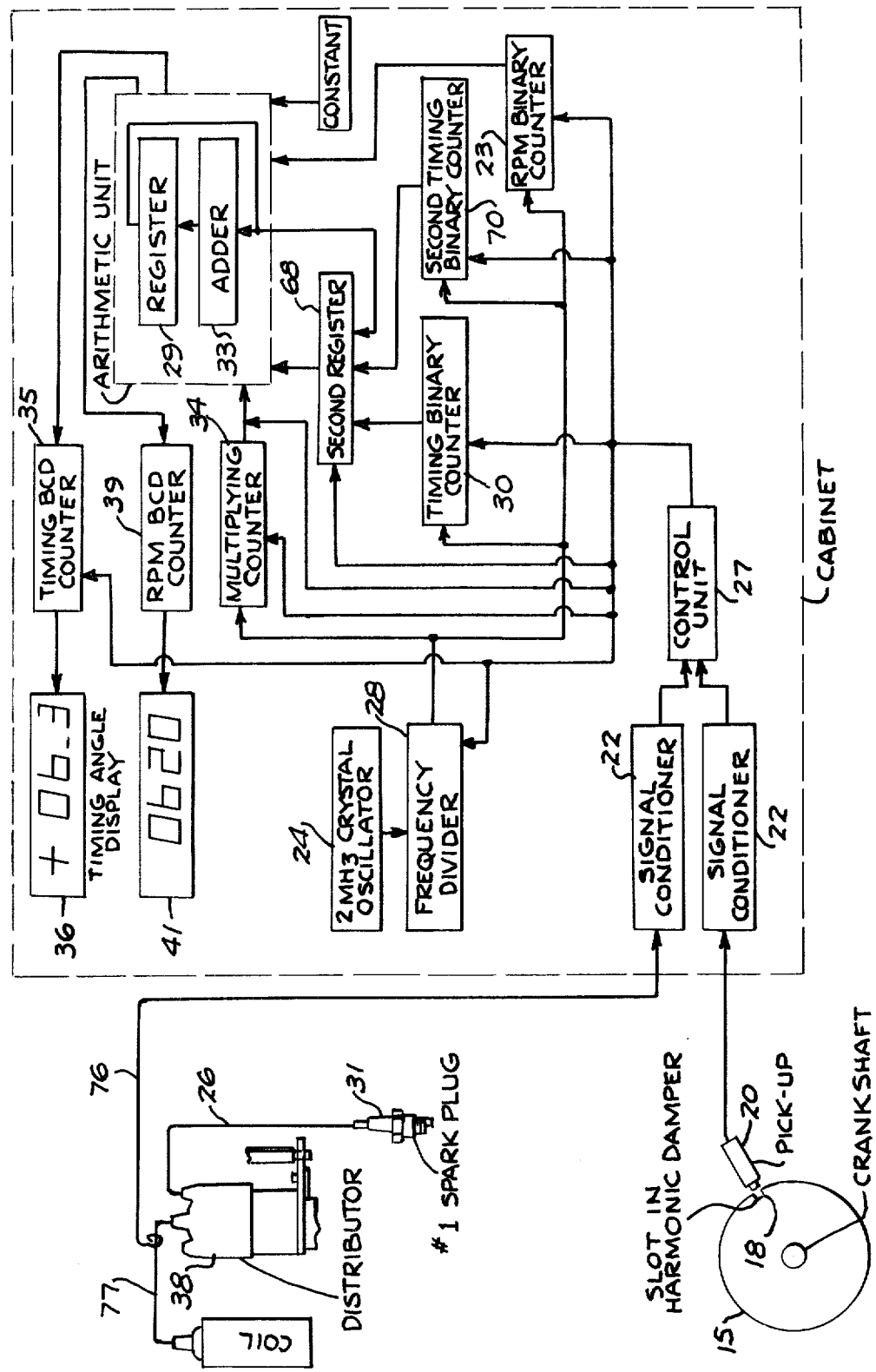

FIG. 18 is a diagrammatic illustration of a complete system set up to find the true average timing angle over all the cylinders of an internal combustion engine regardless of whether it is running in the advanced or retarded spark condition.

Figure 19:
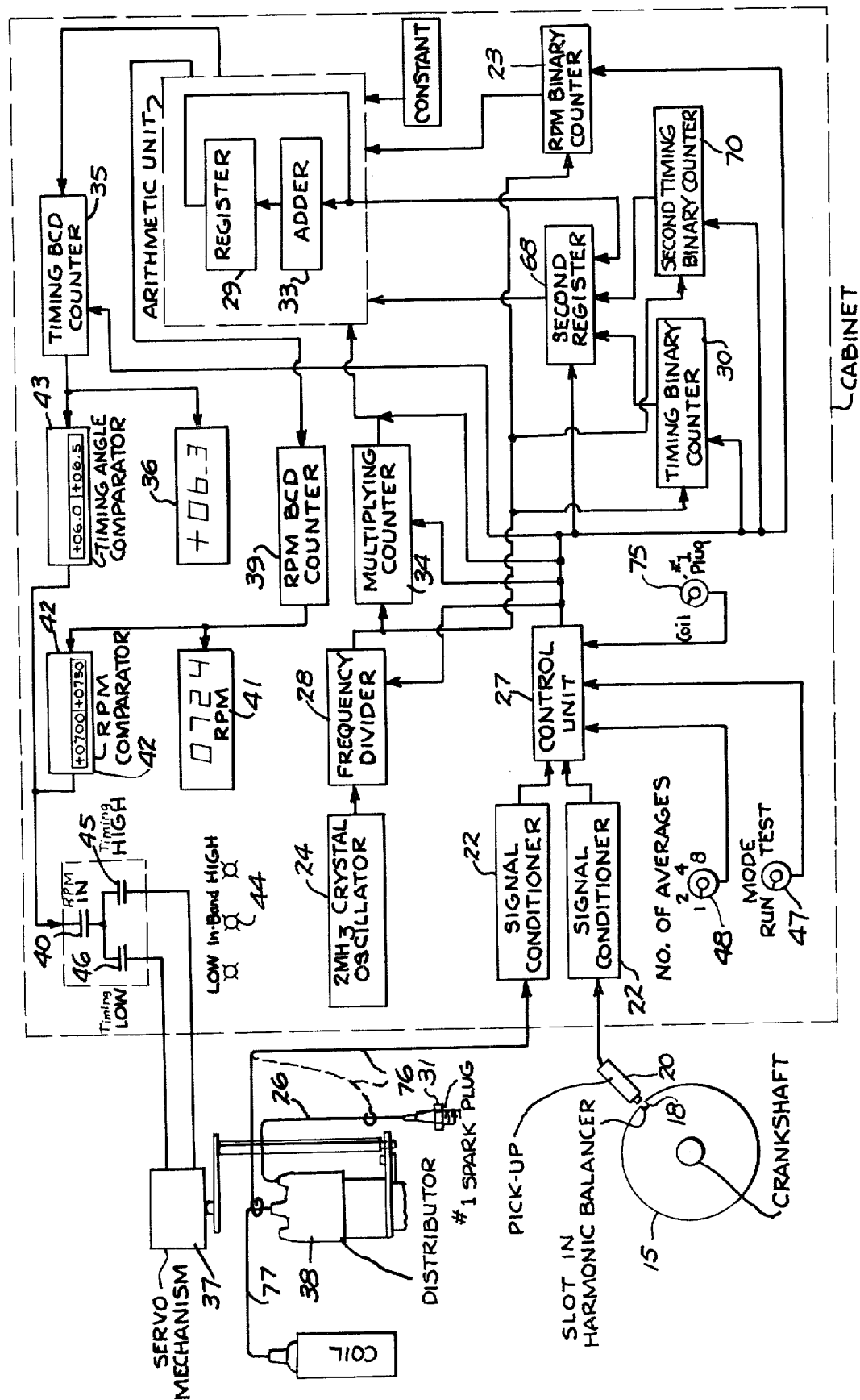

FIG. 19 is a diagrammatic illustration of a complete system set up to find either the true spark advance of one selected cylinder or the true average timing angle over all the cylinders in an internal combustion engine and including the apparatus necessary to compute the timing angle and RPM of the engine, to compare the timing angle obtained with a predetermined range of timing angles, for the predetermined range of RPM, and automatically adjust the distributor to produce a desired value of timing angle, and further including means to internally test the system to insure its correct operation.

Figure 20:
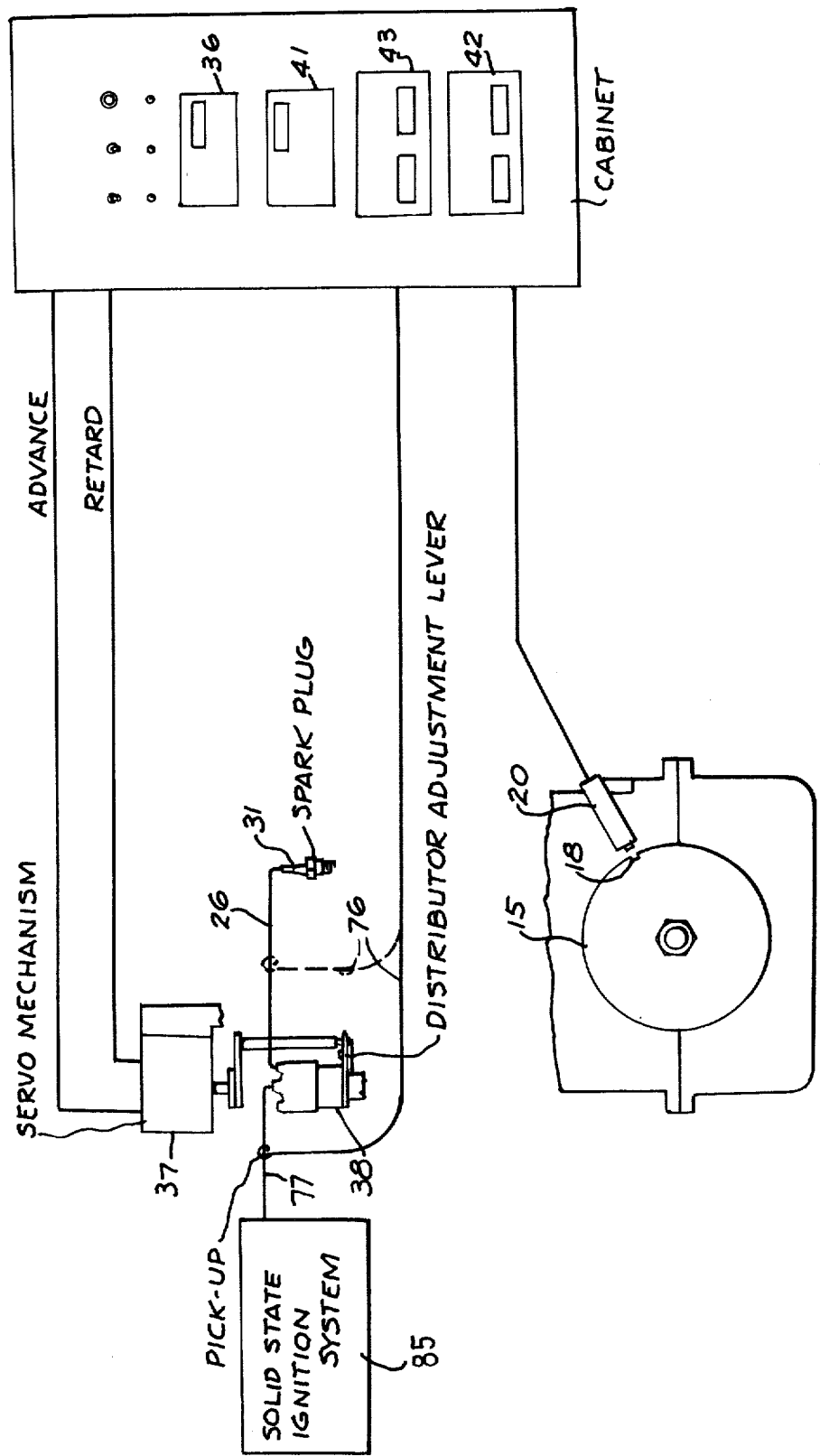

FIG. 20 is an illustration of how the system shown in FIG. 19 may be used with an engine having a solid state ignition system.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

The co-pending application of Richard L. Smith and Dennis F. Sauerbrey discloses a method and apparatus of measuring and adjusting the timing angle of an internal combustion engine by measuring, in effect, the degrees of the angle through which the spark is advanced. With the use of such a method and apparatus, only one set of values is being measured and after the answer in terms of such a value, namely the size of the timing angle, is received, the process is, in effect, completed.

In accordance with my invention, I measure simultaneously two values. First, I measure the time for one full and precise revolution of the engine from top dead center of the selected cylinder to the top dead center thereof. I make such measurements against uniform pulsations produced with the device capable of producing pulsations of sufficient frequency, which frequency must be uniform. While such pulsations are produced, I also measure the number of pulsations occurring from the moment the spark in the selected cylinder fires to the moment the piston in the selected cylinder of the engine reaches the top dead center (for advanced timing). Measuring both values at the same time, I receive values which enable me to compute the timing angle of the engine.

It can be easily understood that if I would count only one value, such as the pulsations from the moment the spark plug of the selected cylinder fires to the moment the piston in the selected cylinder reaches top dead center, I would receive only the time which elapsed between these two moments but would have no way of expressing this time in terms of the angle, that is timing angle, since in order to do that I would need to know the time the engine takes to rotate through one degree. Since I count at the same time the number of pulsations through one full and exact revolution, I can compute the number of pulsations per one degree by dividing the number of pulsations for one revolution by 360. Thereupon, I divide the number of pulsations which occurred between the moment of the spark plug firing to the moment the piston in the selected cylinder reaches the top dead center position by the number of pulsations for one degree. In such a manner I obtain the timing angle expressed in degrees.

Since we are concerned primarily with automobile engines which operate on the principle of four-stroke cycle, the engine makes two full revolutions during which the spark plug fires once. Therefore, I prefer to count the number of pulsations for two full and exact revolutions.

The above-described method of simultaneously counting two values, namely first the number of pulsations with respect to revolutions of the engine and thereupon number of pulsations which take place while the engine rotates through the timing angle. I obtain a definite answer which could not be received counting only one value.

Any device producing known and uniform pulsations can be used for the purposes of the present invention. Since counting of pulsations is done simultaneously, only one device producing pulsations may be used, and both values be counted against pulsations produced by such device.

For the purposes of producing pulsations, I prefer to use a crystal oscillator since such a device can be selected to produce known and uniform pulsations of exceedingly high frequency, such as two million pulsations per second.

In order to define the limits of one revolution or two revolutions, I use indications of top dead center, which indications can be produced with magnetic pickup cooperating with such a device as harmonic damper provided on the engine.

Spark plug firing in one selected cylinder is used, and such spark plug may be either within the cylinder or outside. The indication of the piston in the same selected cylinder reaching the top dead center may be the same as that used to designate the limit of the revolutions.

In the drawings, there is shown an embodiment of the invention operating in a manner as required for measuring and/or revealing the timing angle of one or more automobile engines in production testing of such engines.

I adapt my system to production requirements in an automobile plant. The engine may be tested in any suitable condition it is found in production without any special stands or conveyors, or the test may be made in one stand, or in a large number of stands connected by a conveyor into one system adapted to receive the engines from loading stations and to distribute them to unoccupied stands of the conveyor for test, and after the test to receive them from the test stands and direct them to an unloading station.

It should be understood that it is possible to produce and use a signal other than that of true top dead center as long as the exact relationship between the signal and true top dead center is known so that the resulting answer may be corrected by this difference. Similarly, it is possible to use a signal other than the number one spak plug as long as the exact relationship between the signal and the firing of the number one spark plug is known so that the resulting answer may be corrected by this difference. For example, the number two spark plug could be used.

It should be further understood that it is possible to produce and use a signal other than from a pre-selected spark plug, such as from the coil, or the impulses generated by the distributor.

Figure 1:
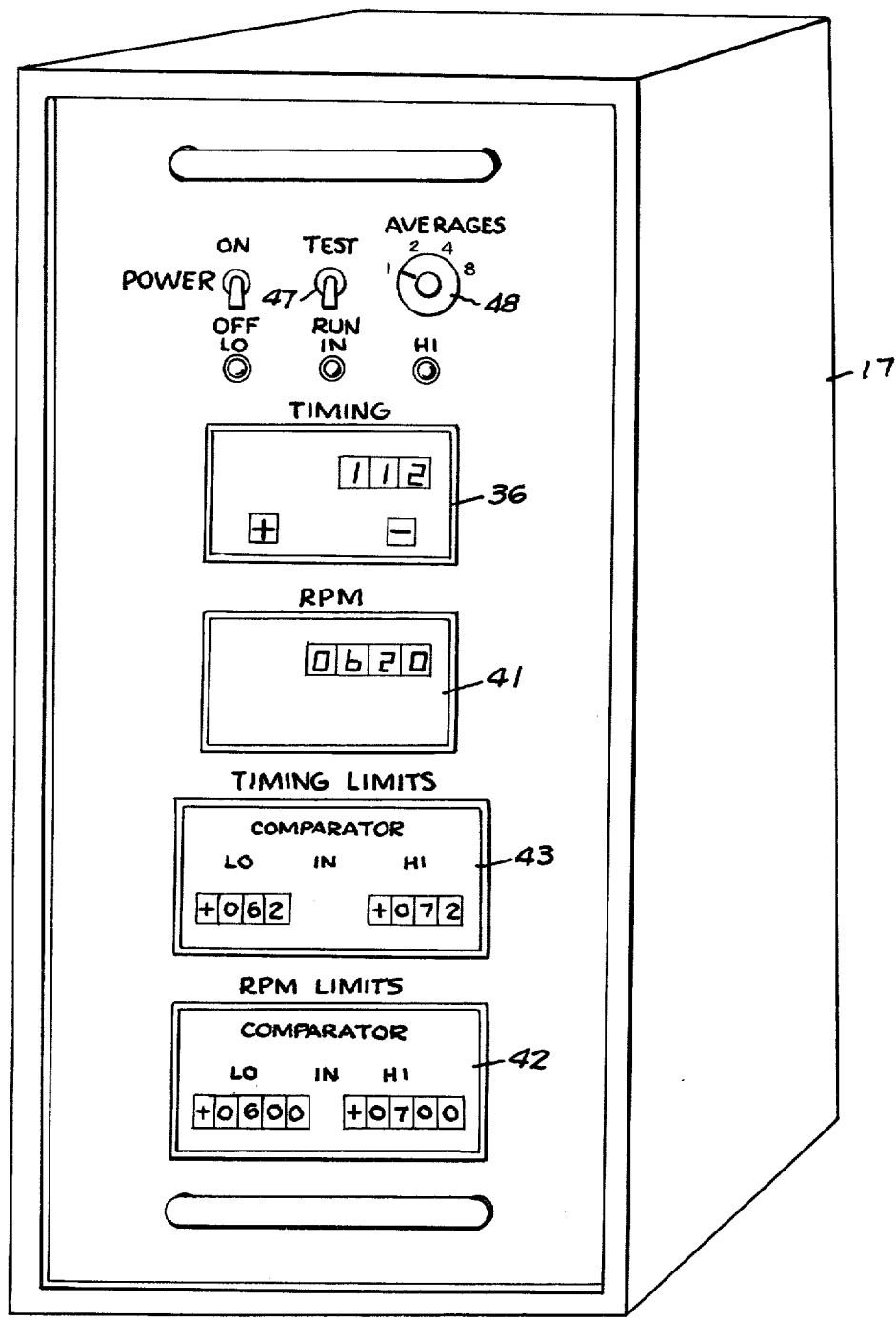
FIG. 1 is a perspective view of the control box for operating the system of the present invention.
Figure 2:
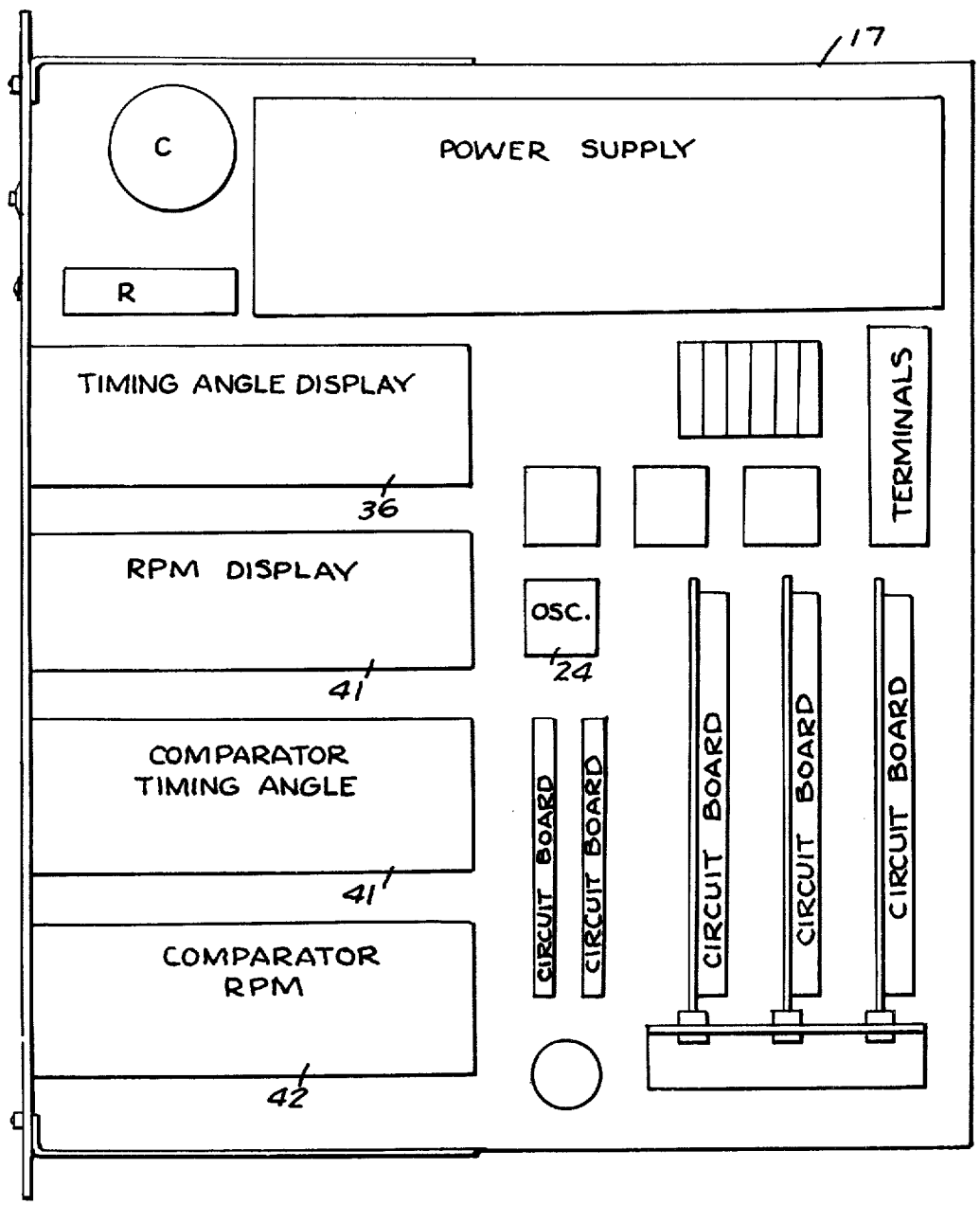
FIG. 2 is a side view of the construction of FIG. 1 with one side panel removed.
Figure 3:
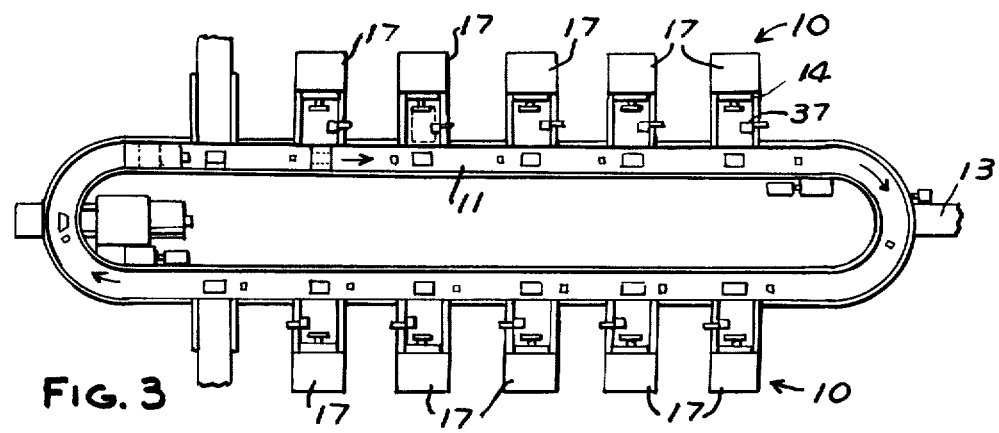
FIG. 3 is a plan view of the system as it may be used in a plurality of test stands connected by a conveyor for measuring and/or adjusting the timing angle of internal combustion engines in quantity production.

Referring specifically to FIG. 3, the same shows a test installation including a plurality of test stands 10 interconnected with the aid of a conveyor 11, which may be such as those disclosed in the co-pending applications of V. G. Converse III, et al., Ser. No. 707,033, filed on Feb. 21, 1968 for Accumulator Conveyor System, now U.S. Pat. No. 3,631,967, and Ser. No. 717,103, filed on Mar. 29, 1968 for Automated engine Test Conveyor, now U.S. Pat. No. 3,527,087. The conveyor 11 is adapted to serve such stands 10 by delivering the test engines, such as 12, (see FIG. 4) from the loading station 13 to the respective stands. The test stand which is empty would receive for test the first passing untested engine, and upon completion of the test return the tested engine to the conveyor for delivery to the station 13 for unloading. The tested engine would not be received by any other stands, even if the stand is empty.

The test performed in each stand depends on the requirements set therefor, and the engines may be run on gasoline, butane gas, or may be operated by compressed air or by an electric or fluid (gas or liquid) motor. Use of compressed air or an electric or fluid motor insures maintenance of a predetermined speed and does not require cooling of the engine, although water may be used in the engine to perform leak tests such as to determine leakage from water cavity to atmosphere. Oil pressure can also be conveniently checked in this test by being continuously monitored while the engine is running, with a view of stopping the engine should oil pressure fail. A visual and audible check for noise can also be done.

Figure 4:
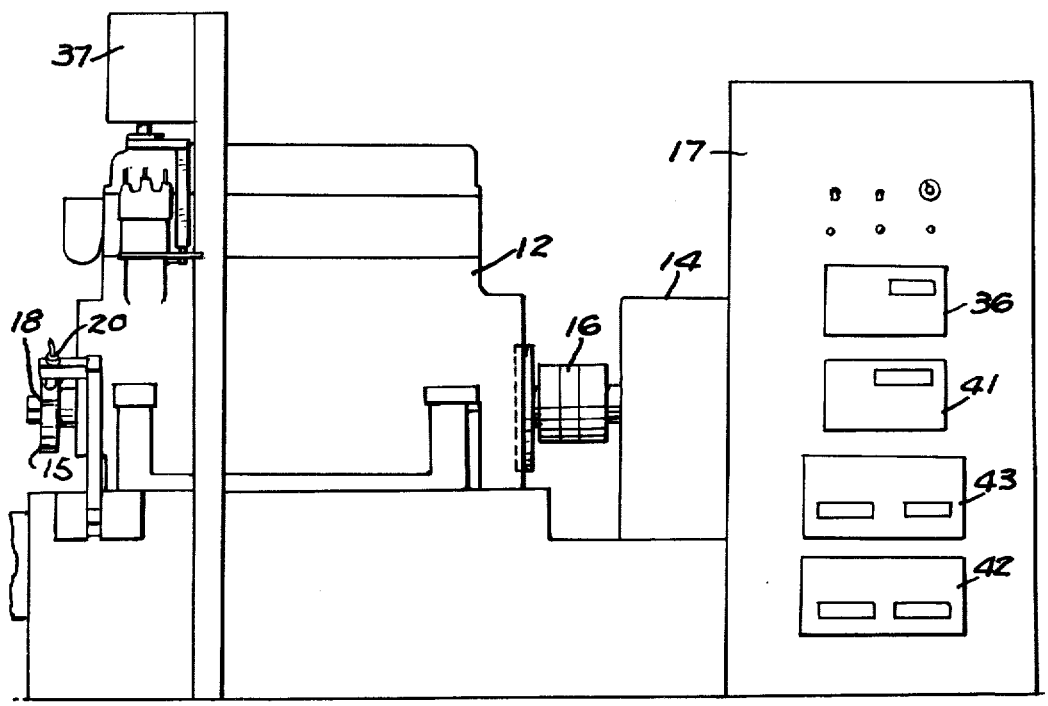
FIG. 4 is a side view of one test stand with the engine shown in said stand.

FIG. 4 illustrates one test stand showing a test engine 12 received by the stand and operatively positioned therein to be driven with the aid of a motor 14 connected to the engine 12 by the coupling 16. The control box 17 is provided in the stand 10 for the purposes explained below.

Now turning to the computation of the timing angle, this is accomplished by measuring the time in seconds between the moment of firing of the number one spark plug (assuming advanced timing) and the moment the piston of the selected cylinder reaches top dead center, and dividing this number by the time in seconds per one degree of engine revolution. This can be represented by the mathematical formula: Timing Angle = 720 Y/X, where Y equals time in seconds between spark plug firing and top dead center and X equals the time in seconds for two revolutions of the engine.

In order to be able to get values for Y and X, two signals from the engine are needed, the top dead center (TDC) signal and the spark firing signal.

Referring to FIG. 4, the TDC (top dead center) signal is produced as follows: On the front end of the engine 12 there is operatively mounted a hamonic damper 15 provided on its periphery with a slot or notch 18 related to the top dead center position of the piston of number one cylinder. A magnetic pickup 20 is operatively installed in the stand in such a manner that when the piston of number one cylinder is at its top dead center position, the notch 18 cooperates with said magentic pickup 20 in such a manner that an electrical impulse is produced each time the number one cylinder is at its top dead center position. This is the TDC signal, the use of which will be explained below.

Figure 5:
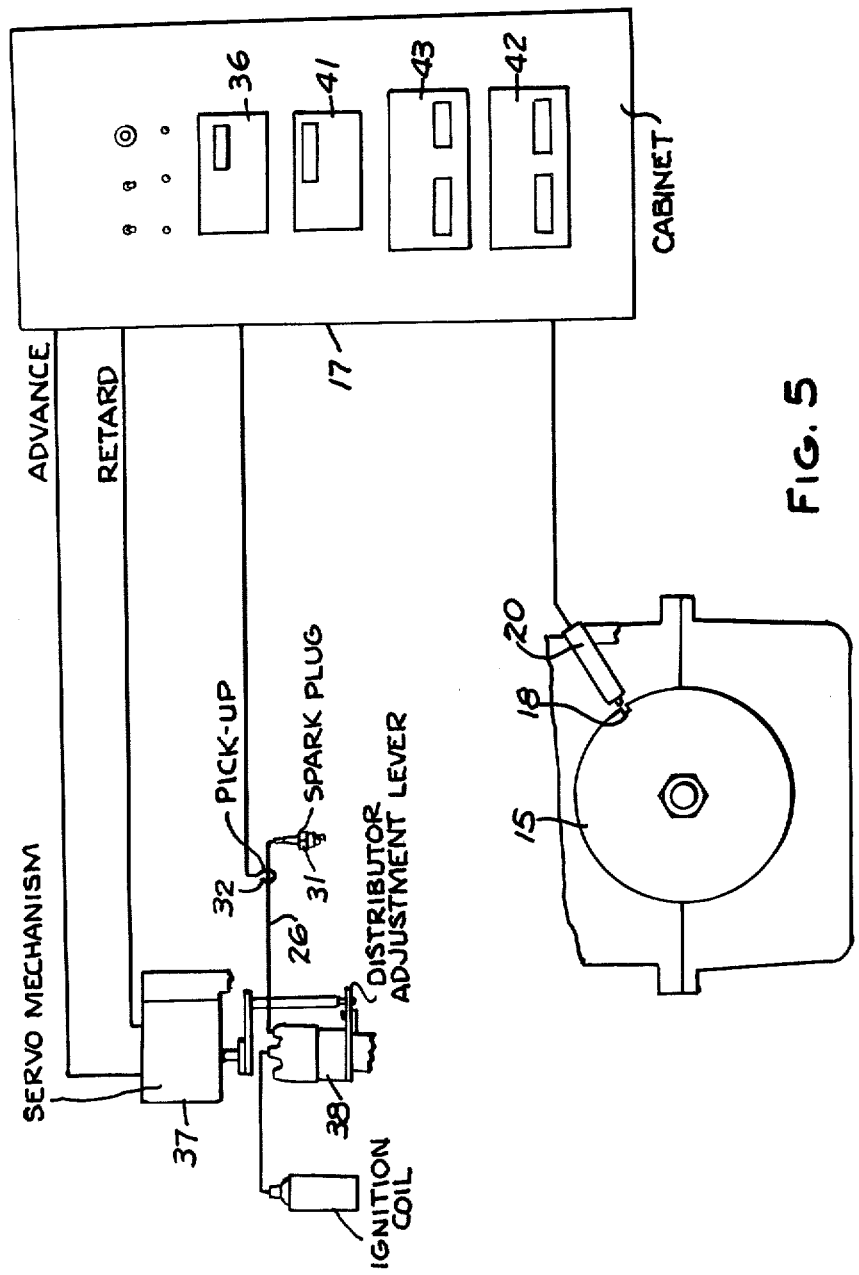
FIG. 5 is a diagram showing one system as it may be used on an engine outside a test stand.

Referring to FIG. 5, the distributor 38 supplies high voltage through the spak plug wire 26 to fire the spark plug 31. The spark firing signal is produced by a wire loop, coil, or clip 32 surrounding the spark plug wire 26, a current being induced in said wire loop, coil, or clip 32 each time the high voltage passes through the spark plug wire 26. This induced current is the spark firing signal whose purpose will be explained in detail below. It should be understood that in accordance with the invention, the spark plug 31 does not need to be mounted in the engine 12 but can be mounted externally thereto, or the spark firing signal may be produced without the use of any spark plug.

Figure 6:
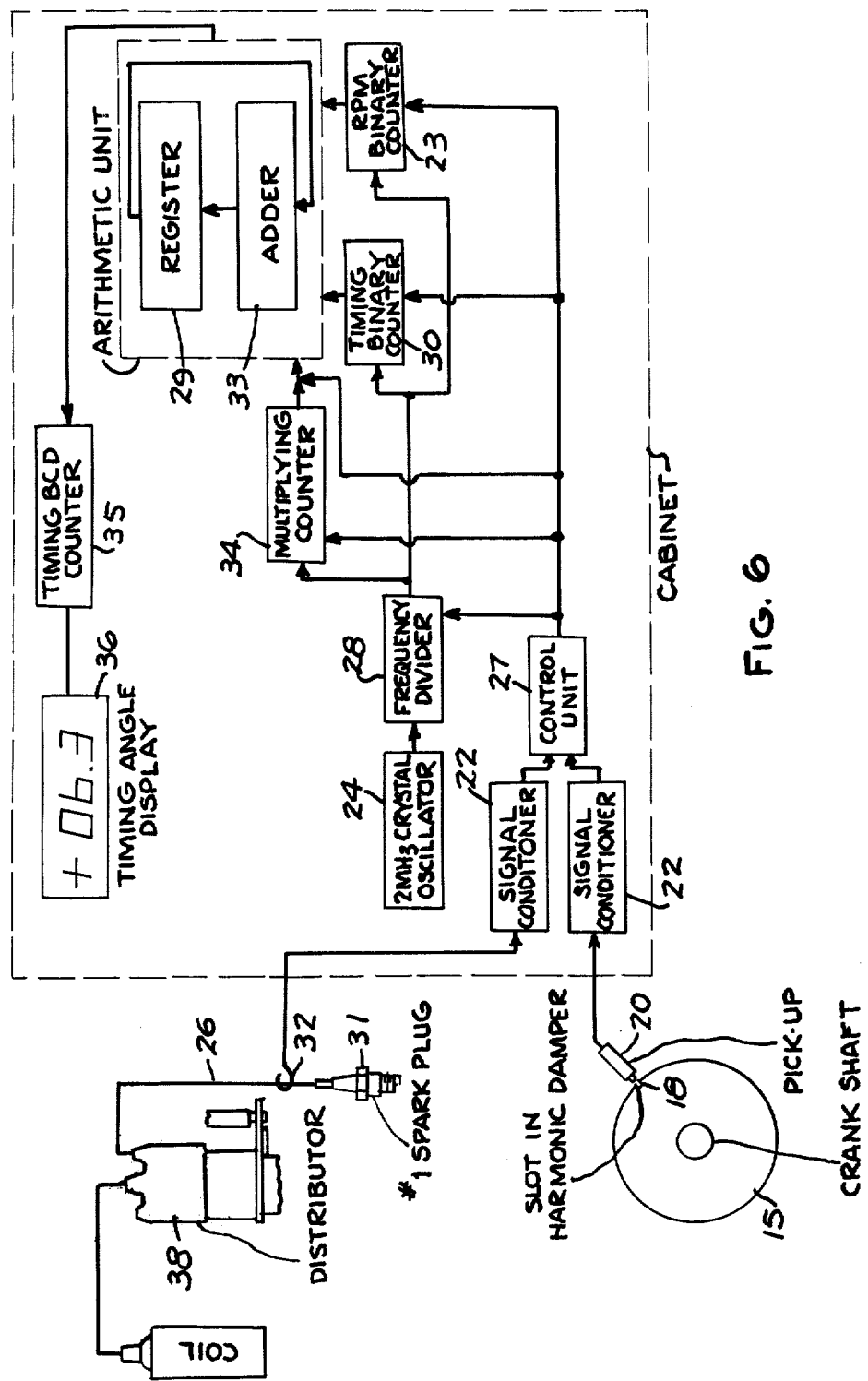
FIG. 6 is a diagram showing one system with a multiplying counter, binary timing counter and timing binary coded decimal counter.
Figure 7:
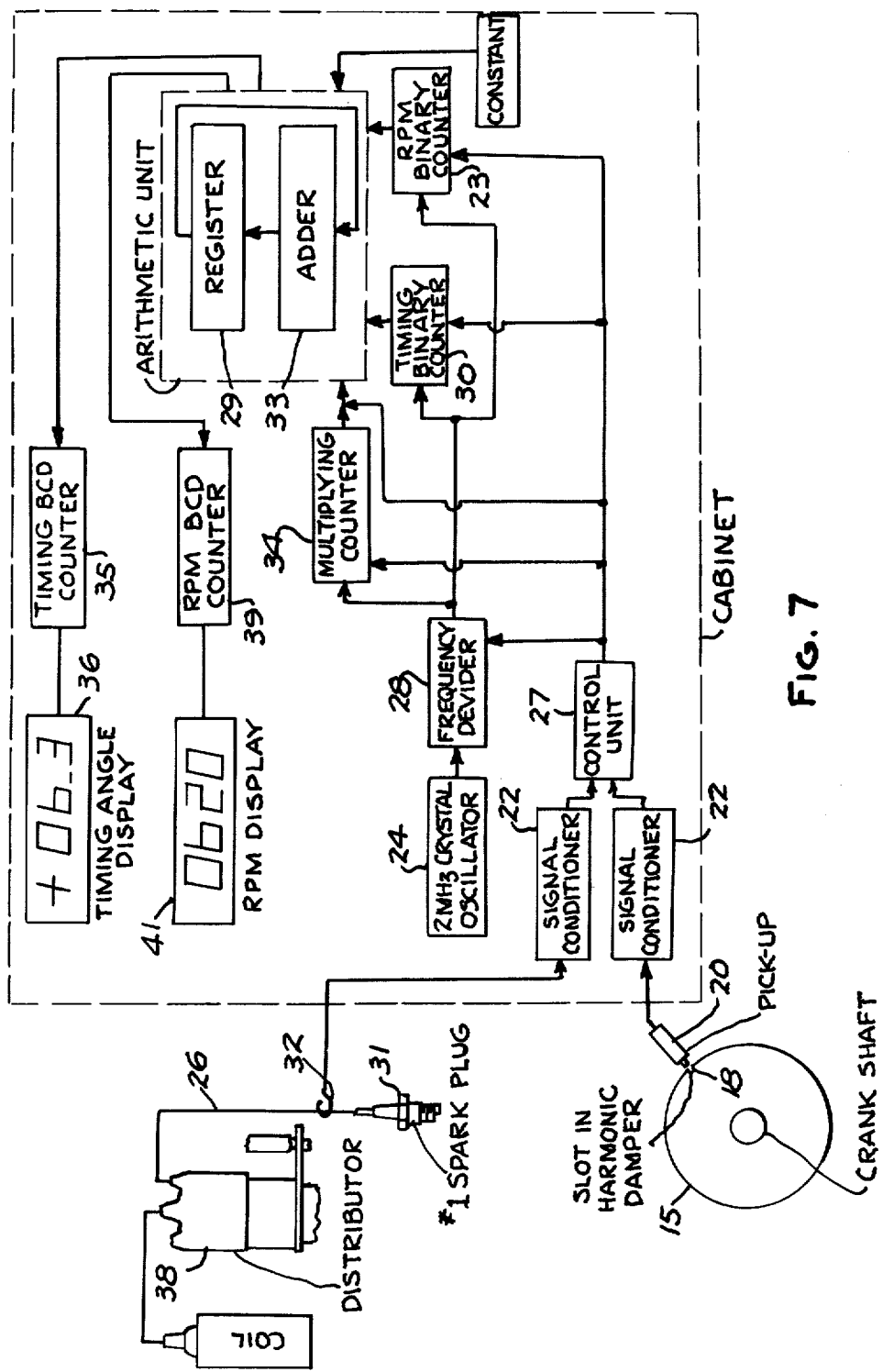
FIG. 7 is a diagram showing a complete system with the multiplying counter, timing binary counter, timing binary coded decimal counter, RPM binary counter, and RPM binary coded decimal counter.

Referring to FIGS. 6, 7 and 8, the TDC signal obtained in the above manner from the magnetic pickup 20 is then passed through a signal conditioner 22 which transforms the input signal into a short duration pulse (approximately 10 microseconds), which is compatible with the rest of the system. This signal is then used to turn on the RPM binary counter 23 to start counting pulsations being produced by the crystal oscillator 24. The circuit will then measure the time interval for two complete revolutions of the harmonic damper 15 which is equivalent of two revolutions of the engine. This is accomplished by a control unit 27 which turns on the RPM binary counter 23 when a top dead center signal is sensed. The counter continues to count pulsations of the frequency produced from a frequency divider 28 which is driven by the crystal oscillator 24, until two revolutions of the harmonic damper are completed, the completion of which is signaled by another top dead center signal. The result of this count of pulsations is stored in the RPM binary counter 23 and is proportional to the value of X above.

Since we are concerned with a four-stroke cycle engine, during the two revolutions of the engine just measured, the number one spark plug must have fired once. For an advanced ignition system, the spark firing signal will occur slightly before top dead center, and for a retarded ignition system the spark firing signal will occur slightly after top dead center. The circuit measures the number of pulsations occurring between the spark plug firing and top dead center (for advanced timing). This is accomplished by the control unit 27 which turns on the timing binary counter 30 when the spark firing signal from the wire loop, coil, or clip 32 is sensed, and turns the timing binary counter 30 off when the top dead center signal is sensed. During the interval that the timing binary counter 30 is turned on, it counts the pulsations of the frequency produced from the frequency divider 28 which is driven by the crystal oscillator 24. This count of pulsations is proportional to the value of Y needed in the above formula.

The actual timing angle computation in this embodiment of the invention is then performed. The register 29 is cleared, the contents of the timing binary counter 30 is applied to the input of the adder 33. This number is added a number of times proportional to 720 to the contents of the register 29 via the adder 33 and the resulting new answer is placed in the register 29, the number of additions being counted by the multiplying counter 34. The previously stored contents of the RPM binary counter 23 is applied to the input of the adder 33 in its negated form. This number is added to the contents of the register 29 via the adder 33 with the result being placed in the register 29. If the register 29 now contains a positive non-zero number, one pulse is counted by the timing binary coded decimal (BCD) counter 35. This process is repeated as long as the register 29 contains a positive number. When this process stops, the timing BCD counter 35 then contains the result of the multiplication of the constant by Y and then that quantity being divided by X which then equals 720 Y/X, which is the timing angle. A timing angle display 36 is provided to give a visual readout of the timing angle so obtained.

If the spark plug fires before top dead center, the positive indicator light on the timing angle display 36 will show the engine as running in an advanced spark condition. If the top dead center signal comes before the spark plug fires, the engine is running in a retarded condition and the negative indicator light will signal this condition.

If it is desired to time the engine in a retarded condition, the time duration between top dead center and spark plug firing is still a positive number and the calculations are all performed in exactly the same manner as above.

Now, referring specifically to FIG. 7, this figure shows the same system as shown in FIG. 6 with the additional apparatus needed to calculate the RPM.

The RPM of the engine is calculated by dividing 60 (the number of seconds in a minute) by the time in seconds for one revolution of the engine. This can be represented by the mathematical equation: RPM = 120/X, where X represents the time for two revolutions of the engine.

In the present embodiment of the invention, the actual RPM calculation using the above formula is done as follows: The register 29 is cleared and a number proportional to the constant 120 is added to the register 29 via the adder 33, with the resulting answer being put back in the register 29. The previously stored contents of the RPM binary counter 23 is applied to the adder 33 in its negated form. This negated number is added to the register 29 via the adder 33, with the resulting answer placed in the register 29. If the register 29 now contains a positive, non-zero number, one pulse is counted in the RPM binary coded decimal (BCD) counter. This process is repeated as long as the register 29 contains a positive number. The RPM BCD counter 39 will now contain the result of the division of the constant divided by the contents of the RPM binary counter 23 which is equal to 120/X, which is the RPM of the engine.

It should be understood that in both of these calculations, the actual circuitry and numbers used therein have been scaled to minimize the amount of circuitry and approximately maintain the same degree of resolution throughout the circuit. Therefore, numbers that are proportional to the constants in the previously cited formulas are used rather than the actual numbers.

Referring specifically to FIG. 8, an RPM display 41 is provided to give a visual readout of the RPM of the engine. Also, the results of the RPM calculation are applied to the RPM comparator 42 which compares the contents of the RPM BCD counter 39 to predetermined lower and upper limits. If the number is not within these limits, the timing comparator 43 is disabled by the lockout relay 40 and the timing angle display is blanked out. If the RPM is within predetermined limits, a timing angle comparator 43 compares the contents of the timing BCD counter 35 to lower and upper limits and illuminates one of the appropriate indicator lights 44 to indicate whether the timing is high, low, or in band, and if needed also energizes one of the appropriate relays to drive the servo-mechanism 37 in the appropriate direction to adjust the distributor 38 to produce a desired value of the timing angle.

One of two relays would be energized. If the timing angle were too high, the high value relay 45 would be activated and would activate the servo-mechanism 37 so as to rotate the distributor 38 in the appropriate direction to lower the timing angle, at which time the calculation and comparison process would start anew to see whether the new value of the timing angle is in band. If the timing angle is too low, the low value relay 46 would be activated in such a manner as to have the servo-mechanism 37 rotate the distributor in the opposite direction, thus raising the timing angle, with the same recalculation and recomparison process again following.

The above process, when complete, has calculated the timing angle and RPM, compared the RPM with a desired range and if the RPM is in the desired range, used the value of the timing angle to adjust the distributor to obtain a desired timing angle.

The servo-mechanism and its control circuitry may be eliminated and the adjustment done by hand if the system is used manually.

An engine simulation test which can be selected by the mode switch 47 supplies through the frequency divider pulses representing top dead center and spark to be used in place of the signals coming from the signal conditioners 22. Under these conditions, specific numbers should be displayed on the timing angle display 36 and on the RPM display 41. THis provides for an easy internal self test to check the operation of the unit.

Also, if a more stable result from the system is desired, instead of performing the timing and RPM calculation over two revolutions of the engine, it may be performed over a larger number of revolutions. I prefer to use powers of the number 2 (i.e., $2^z$, where $z = 0, 1, 2, \ldots$ ) since the system performs its mathematical computations in the binary system, which is based on the number 2. A number of averages, such as 4 or 8, can be selected by the number of averages switch 48.

It should be understood that measuring the number of pulsations through two full and exact revolutions of the engine may be done between spark firings, since that equals two revolutions of the engine.

FIG. 9 shows the damper 50 provided with the slot 51, and having a bulb 52 providing a light signal to affect a light sensor, such as a phototransistor 53, to provide a top dead center signal.

FIG. 10 shows another modification of the harmonic damper. The damper 54 is provided with a hole 55 having an electric light 56 on one side and a light sensor on the other side.

FIG. 11 shows the spark plug 31 having a metal tube 60 provided on the top of the spark plug to non-inductively receive the spark signal and convey it to the signal conditioner 22 through the wire 61.

FIG. 12 shows use of a resistor 62 to take the place of the spark plug, one side of the resistor 62 being grounded, the signal being transmitted to the signal conditioner through the wire 63.

FIG. 13 shows a wire loop, clip, or coil 32 around the spark plug wire 26 to inductively produce the spark firing signal when the spark plug 31 fires.

FIG. 14 shows the distributor points 64 producing the signal to the signal conditioner 22.

Applicant has also found that in many cases it is desired to have the true average timing angle over all the cylinders of an internal combustion engine. This is due to the fact that it has been found as a result of the extensive testing done on internal combustion engines due to recent emissions control laws, that even though you have the number one piston set at its top dead center position, due to tolerance stack-up, the journals of the crankshaft, and, therefore, the pistons in the other cylinders will not be exactly 90° apart, thereby causing the spark firings in the other cylinders to occur at other than their ideal times. This is further aggravated by tolerance stack-ups in other engine parts, such as the distributor, etc.

I have found that the difference between the average timing angle of all the cylinders in a V-8 internal combustion engine, and that of the number one cylinder alone, can be as much as 1°. This can be a significant factor in the amount of emissions produced in any given engine, and therefore the true average timing angle has become an important piece of information in the art.

While attempts to find the true average timing angle are old in the art, and many devices are on the market which purport to find the true average timing angle over all the cylinders of an internal combustion engine, none of them can meet the present day requirements for accuracy.

This stems from the fact that all such devices until the present time have had an inherent inaccuracy built in to them because they assume engine speed constant, which as mentioned previously, it never is.

I have adapted the method and apparatus just described for finding the true spark advance in one selected cylinder, to find the true average spark advance over all the cylinders of an internal combustion engine, all without assuming engine speed constant.

I do this by obtaining a time value for the true spark advance of each cylinder in the selected engine. I then add these time values together and divide by the number of cylinders involved to get a true average spark advance time; dividing the time just obtained by the time the engine takes to rotate one degree gives you the true average spark advance over all the cylinders in the selected engine in degrees.

It should be understood that while for purposes of illustration a V-8 engine is shown, my invention will work equally as well on a 4 or 6 or other number cylinder engine, whether reciprocating or rotary, with appropriate changes in the equations discussed below, and will do so irregardless of whether the engine is equipped with a conventional spark ignition system or any of the great variety of solid state ignition systems now being installed on engines as standard equipment or sold as an after-market replacement. It should also be understood that, although for convenience in keeping the circuitry involved to a minimum, Applicant chooses to pick up a signal from the coil wire, the measurement of the true average timing angle may be performed just as well by picking a signal up from each spark plug on the engine as it fires or any other appropriate place, depending on the particular engine being tested.

Referring to FIG. 16 which shows graphically how Applicant's invention is applied to a V-8 engine running in an advanced spark condition, it can be seen that during two (2) revolutions of the engine, each spark plug of the V-8 engine must have fired at least once. Each firing of a spark plug is represented as a coil pulse, as shown in FIG. 16.

It should be understood that while the coil pulses are numbered from one to eight, in this case the number does not represent the number of the cylinder where the spark firing occurred as it did when we were concerned with the true spark advance of one cylinder, but instead it represents the order of the spark firings during the two revolutions I chose to measure. For example, the number one coil pulse would represent the spark firing of the first cylinder I chose to measure, even though, using the standard numbering system for a V-8 engine it might have occurred in the number four cylinder.

When you are finding an average spark advance over all eight cylinders, as long as you measure the spark advance of all the cylinders once during two revolutions, it makes no difference where you start.

Since, during two (2) revolutions of engine, which equals 720° of rotation, each spark plug must have fired once, it is easily seen that this means that in a V-8 engine a spark plug will ideally fire every 90°. Therefore, the distance between each coil pulse shown in FIG. 16 represents the time the engine takes to rotate 90°.

Since each coil pulse represents a spark plug firing, it can be seen that for the situation where the engine is running in a condition such that the ignition is advanced, the time interval between the last coil pulse occurring during the previous two revolutions of the engine, indicated by the numeral eight, since there are eight spark occurrences in two revolutions, and the first top dead center (TDC) pulse indicated by the numeral 1 in FIG. 16 represents the time interval between the last spark plug firing and the piston in the respective cylinder reaching its top dead center position or, in other words, this time represents the spark advance of the last spark plug to fire in the previous two revolutions. I now chose this time interval as one of eight time intervals which I will measure during two revolutions of the engine. Therefore, to measure the spark advance of all eight cylinders I must find the values of $A_1$, $A_2$, $A_3$, $A_4$, $A_5$, $A_6$, $A_7$ and $A_8$.

While I could have an apparatus which would measure a value for the time which the engine takes to rotate until each spark plug fires, measured from a selected starting point, and then subtract from the value so measured for each cylinder, the time the engine took to rotate from the last occurring TDC pulse, to the spark firing in question and thereby obtain the values for $A_1$, $A_2$, $A_3$, $A_4$, $A_5$, $A_6$, $A_7$ and $A_8$, means to do this are somewhat complicated, and not necessary, when by looking at the mathematical equations which can be derived from FIG. 16, it can be seen that much simpler formula can be used, with no loss of accuracy.

The value of $A_1$ can also be represented by the time the engine takes to rotate 90°, minus the time interval between the first TDC pulse and the time the engine takes to rotate to the first spark plug firing, or $A_1 = 90° - t_1$, or by substituting the time the engine takes to rotate two (2) revolutions, represented by the capital letter X, $A_1 = X/8 - t_1$.

Since the second spark firing will ideally occur at a time when the engine has rotated to a position 90° farther than when the first spark firing occurred, it can be seen that this second spark firing (represented by the number 2 coil pulse in FIG. 16) takes place at a time $180° - t_2$, or as in a manner similar to above, is equal to $2X/8 - t_2$, which equals $A_2$, the true spark advance of the second cylinder to fire.

In a similar fashion, the spark advance for each cylinder can be found by performing similar steps to get the value of $A_3$, $A_4$, $A_5$, $A_6$ and $A_7$, and finally arriving with the value of $A_8$ equal to $4X/8 - t_8$. If we let Z equal the average spark advance for all eight (8) spark plug firings, then:

1. Timing Angle $= Z/X(720°)$. With X = time for two revolutions of the engine, as before.

Substituting the value of Z in this formula and simplifying wherever possible we arrive with the formula:

2. $Z = [(X/8 - t_1) + (2X/8 - t_2) + (3X/8 - t_3) + (4X/8 - t_4) + (X/8 - t_5) + (2X/8 - t_6) + (3X/8 - t_7) + (4X/8 - t_8)]/8$.

Simplifying further we arrive at the formula:

3. $Z = -(t_1 + t_2 + t_3 + t_4 + t_5 + t_6 + t_7 + t_8)/8 + (20X/8)/8$

Substituting this value of Z in our formula (1) above we arrive at:

4. Timing Angle $= [-(t_1 + t_2 + t_3 + t_4 + t_5 + t_6 + t_7 + t_8)/8 + 5X/16]720.0/X$ After simplification we come up with the formula:

5. Timing Angle $= -(t_1 + t_2 + t_3 + t_4 + t_5 + t_6 + t_7 + t_8)90/X + 225.00$.

The formula will remain exactly the same should the engine be running in a retarded spark condition, except the value of the timing angle in the formula:

5. Timing Angle $= -(t_1 + t_2 + t_3 + t_4 + t_5 + t_6 + t_7 + t_8)90/X + 225.0$ would turn out to be a negative number.

It can now be seen that only one set of values, the values of $t_1$, $t_2$, $t_3$, $t_4$, $t_5$, $t_6$, $t_7$ and $t_8$ need now be measured, rather than the two sets mentioned above.

Similar equations can be derived for six cylinder and four cylinder engines, such that only the values of $t$ need be found.

If the graphs were to be set up and the formulas derived in a manner similar to that followed above, for a six cylinder engine having a star-shaped crankshaft, you would derive the following formula for timing angle:

6. Timing Angle $= - (t_1 + t_2 + t_3 + t_4 + t_5 + t_6)120/X + 240$

If the formula for a four cylinder engine having a flat crankshaft were desired, you would arrive at:

7. Timing Angle $= - (t_1 + t_2 + t_3 + t_4)180X + 270$

Other formulas may be worked out for engines with other cylinder arrangements, or for rotary engines.

It should be understood that although the various values for spark advances $A_1$, $A_2$, $A_3$, $A_4$, $A_5$, $A_6$, $A_7$ and $A_8$ appear to be exactly identical in the graphs of FIGS. 16 and 17, in reality, due to tolerance stack-ups and the like, each of these values will be slightly different. However, this value is impossible to show accurately on drawings of the present scale.

Referring to FIGS. 18 and 19, the TDC signal obtained in a manner similar to that just described for measuring the timing angle of one cylinder, from the magnetic pick-up 20, is passed through the signal conditioner 22, which transforms the signal into a short duration pulse (approximately 10 micro-seconds) which is compatible with the rest of the system.

This signal is then used to turn on the RPM binary counter 23 to start counting pulsations being produced by the crystal oscillator 24. The circuit will then measure the time interval for two (2) complete revolutions of the harmonic damper 15, which is equivalent to two (2) complete revolutions of the engine. This is accomplished by a control unit 27 which turns on the RPM binary counter 23 when a top dead center signal is sensed. The counter continues to count pulsations of the frequency produced from a frequency divider 28, which is driven by the crystal oscillator 24 until two (2) revolutions of the harmonic damper are completed, the completion of which is signaled by another top dead center signal. The result of this count of pulsations is stored in the RPM binary counter 23. When measuring the true average timing angle over all eight cylinders of an internal combustion engine, the circuitry is set up as shown in FIG. 18 and includes a second register 68 and a second timing binary counter 70 which were not present when performing the measurement of the timing angle for a single cylinder, but are necessary in finding the true average timing angle over all eight (8) cylinders for the reasons which will be explained below.

Since we are concerned here with a V-8 four-stroke cycle engine with an advanced ignition system, the TDC pulse from the magnetic sensor 20 also turns on the timing binary counter 30. At the occurrence of the first coil pulse, the contents of the timing binary counter 30 are transferred to the second register 68. Note that timing binary counter 30 has not been turned off, but continues to operate and has just been read at a certain point in time. This number obtained is added to the contents of register 29, via the adder 33, with the result being placed in the register 29. This now gives us the value of $t_1$.

For the 2nd, 3rd and 4th spark plug firings, which are represented by the numbers 2, 3 and 4 in FIG. 16, the same process is repeated. At the occurrence of the second coil pulse, the contents of the timing binary counter 30 are again transferred to the second register 68, the contents of the second register 68 are added to the contents of the register 29, via the adder 33, with the resulting answer placed in register 29. This now gives us the sum of $t_1 + t_2$.

At the occurrence of the third spark firing, represented by the number 3 in the graph of FIG. 16, the contents of the timing binary counter 30 are again transferred to the second register 68. The contents of the second register 68 are added to the contents of register 29, via the adder 33, with the resulting answer again placed in register 29. This now gives us the sum of $t_1 + t_2 + t_3$.

When the fourth spark firing occurs, represented by the number 4 coil pulse in FIG. 16, the contents of the timing binary counter 30 are again transferred to the second register 68, the contents of the second register 68 are added to the contents of register 29, via the adder 33, with the resulting answer placed in register 29. This now gives us the sum of $t_1 + t_2 + t_3 + t_4$. The timing binary counter 30 is now turned off.

The second TDC pulse from the magnetic pick-up 20 (see FIG. 18) now occurs and turns on the second timing binary counter 70. The same process just described for obtaining the sum of $t_1 + t_2 + t_3 + t_4$ is now repeated to obtain the sum of $t_5 + t_6 + t_7 + t_8$, except that the second timing binary counter 70 is used, instead of the timing binary counter 30. Therefore, the register 29 now contains the sum of $t_1 + t_2 + t_3 + t_4 + t_5 + t_6 + t_7 + t_8$.

If engines were always found to be running in an advanced spark condition, the use of the second timing binary counter 70 would not be needed, and all the values of $t_1 + t_2 + t_3 + t_4 + t_5 + t_6 + t_7 + t_8$ could be found using timing binary counter 30. However, the use of the second timing binary counter 70 is necessitated by the conditions brought about if the engine happens to be running in a retarded spark condition. As shown in FIG. 17, the fact that the second TDC pulse will now occur before the 4th coil pulse, will cause the time interval $t_4$ to be completed after the measurement of the time intervals $t_5$, $t_6$, $t_7$, $t_8$ has already started, and it can be seen that if only one timing binary counter was used, you would have the impossible situation where one timing binary counter would be attempting to count two different values simultaneously. Therefore, the use of two timing binary counters is desirable in order to enable my invention to be operable regardless of the condition in which the test engine is found, and still get the optimum accuracy. Any change in the starting point of the measurement of the time intervals $t_1$, $t_2$, $t_3$, $t_4$, $t_5$, $t_6$, $t_7$ and $t_8$ would decrease the accuracy of the system.

The next step in the performance of the calculation is to preset the timing BCD counter 35 to a + 225 to account for the constant in the timing angle formula. It should be understood that in this embodiment of the invention, an up-down (bi-directional) timing BCD counter is used, that is, a counter which has the capability of counting either up or down, and also has the capability of being reset to zero, or being preset to some non-zero number, in this case + 225. Counters such as this are well known in the art and need not be described in detail herein.

Now that we have the sum of $t_1 + t_2 + t_3 + t_4 + t_5 + t_6 + t_7 + t_8$, it can be seen that the next step in the equation is to multiply the sum of $t_1 + t_2 + t_3 + t_4 + t_5 + t_6 + t_7 + t_8$ by the constant 90. This is accomplished by transferring the contents of the register 29 to the second register 68. The register 29 is then reset to zero. The contents of the second register 68 is added to the contents of register 29 via the adder 33, with the resulting value placed in register 29. This operation is repeated 90 times, at which time the multiplying counter 34 signals its completion.

We have thus added the sum of $t_1 + t_2 + t_3 + t_4 + t_5 + t_6 + t_7 + t_8$ to itself 90 times, or in other words, we have multiplied it by 90.

The next step is to divide this result by the time the engine takes to rotate 720°, represented by the letter X. This number is now contained in the RPM binary counter 23. The contents of the RPM binary counter 23 are applied to the input of the adder 33 in its negated form. This number is added to the contents of the register 29, via the adder 33, with the result being placed in the register 29. If register 29 now contains a positive non-zero number, one pulse is counted by the timing binary coded decimal (BCD) counter 35, this process is repeated as long as the register 29 contains a positive number. When this process stops, we have completed the division by the variable X. The timing BCD counter 35 counted down this number of pulses, which represents the division.

Since the timing BCD counter 35 was originally preset to + 225, when we have counted down the number of pulses equal to the division first performed, we have then completed the calculations involved in the equation: Timing Angle $= -(t_1 + t_2 + t_3 + t_4 + t_5 + t_6 + t_7 + t_8)90/X + 225.0$ and now have the true average timing angle over the eight cylinders of a V-8 internal combustion engine. In a manner similar to that described in the method for finding the true timing angle in one selected cylinder, a timing angle display 36 is provided to give a visual readout of the timing angle so obtained.

The RPM of the engine is calculated by dividing 60 (the number of seconds in a minute) by the time in seconds for one revolution of the engine. Again, this is represented by the mathematical equation RPM = 120/X, where X represents the time for two revolutions of the engine.

In the present embodiment of the invention, the actual RPM calculation using the above formula is done as follows: The register 29 is cleared, and a number proportional to the constant 120 is added to the register 29, via the adder 33, with the resulting answer put back in the register 29. The previously stored contents of the RPM binary counter 23 is applied to the adder 33 in its negated form. This negated number is added to the register 29, via the adder 33, with the resulting answer placed in the register 29. If the register 29 now contains a positive non-zero number, one pulse is counted in the RPM binary coded decimal (BCD) counter 39. This process is repeated as long as the register 29 contains a positive number. The RPM BCD counter 39 will now contain the result of the division of the constant, divided by the contents of the RPM binary counter 23, which is equal to 120/X, which is the RPM of the engine.

As was the case in the previously described calculation of RPM in the system which found the timing angle of one selected cylinder of an internal combustion engine, the actual circuitry and numbers used herein have been scaled to minimize the amount of circuitry required, and maintain approximately the same degree of resolution throughout the circuit. Therefore, numbers that are proportional to the constant in the previously cited formula are again used, rather than the actual numbers.

Referring specifically to FIG. 19, in a manner similar to that described before, an RPM display 41 is provided to give a visual readout of the RPM of the engine. Also the results of the RPM calculation are compared by the RPM comparator 42 which compares the contents of the RPM BCD counter 39 to predetermined lower and upper limits. As before, if the number is not within these limits, the timing comparator 43 is disabled by the lock-out relay 40, and the timing angle display is blanked out. If the RPM is within predetermined limits, a timing angle comparator 43 compares the contents of the timing BCD counter 35 to lower and upper limits and illuminates one of the appropriate indicator lights 44 to indicate whether the timing is high, low, or in band, and, if needed, also energizes one of the appropriate relays to drive the servo-mechanism 37 in the appropriate direction to adjust the distributor 38 to produce a desired value of the timing angle.

One of two relays would be energized. If the timing angle were too high, the high value relay 45 would be energized and would activate the servo-mechanism 37 so as to rotate the distributor 38 in the appropriate direction to decrease the timing angle, at which time the calculation and comparison process would state anew to see whether the new value of the timing value is in band. If the timing angle is too low, the low value relay 46 would be energized in such a manner as to have the servo-mechanism 37 rotate the distributor in the opposite direction, thus increasing the timing angle, with the same recalculation and recomparison process again following.

The above process, when complete, has calculated the true average timing angle and RPM, compared the RPM with a desired range, and if the RPM is in the desired range, used the value of the timing angle to adjust the distributor to obtain a desired timing angle.

As was the case in the apparatus previously described for finding the timing angle of one selected cylinder, the servo-mechanism and its control circuitry may be eliminated and the adjustment done by hand if the system is used manually.

The circuitry in FIG. 19 also shows the necessary apparatus needed if it is desired to have a system which can operate either to find the timing angle in one selected cylinder, or to find the true average timing angle over all cylinders of an internal combustion engine. In order to accomplish such dual operation, an additional switch 75 is provided, which will adapt the system either for accepting an impulse from the number one spark plug through the lead wire 76, or accepting an impulse from the coil wire 77, when the lead 76 is placed thereon, instead of on the spark plug 26. When the switch is in the position marked coil, the lead wire 76 must be placed on the coil wire 77, and when the switch 75 is in the number one plug position, the lead wire 76 must be attached to the spark plug wire 26, leading to the number one spark plug 31.

Also provided in the dual system shown in FIG. 19 is the mode switch 47 to select between the run mode and test mode for the purposes previously described.

The number of averages switch 48 is again provided. However, in the system which can find the timing angle of one selected cylinder, and also the true average timing angle over all the cylinders, its operation is somewhat different than that previously described.

When the switch 75 shown in FIG. 19 is set to its number one plug position, the number of averages switch 48 works exactly in the same manner as previously described.

However, when the switch 75 is in the coil position, the number of averages switch finds the timing angle value by averaging not readings of a single cylinder, as before, but by averaging 2, 4, 8, etc. complete cycles of the machine. In other words, the apparatus would find the true average timing angle of the test engine 2 or more separate times, it would then average the different values obtained and display this number on the timing angle display.

As before, the apparatus shown in FIG. 19 may be used manually, outside an automated stand, as shown in FIG. 15, or may be incorporated into a stand similar to FIG. 4.

The present invention may also be used on engines which have a solid state ignition system. Although many variations of solid state ignition systems are available today, and all of them cannot be shown here, a solid state system which is in wide use today may be illustrated as shown in FIG. 20, with the box numbered 85, representing the various components of the solid state system, which are well known in the art and need not be described in detail herein.

The solid state ignition system 85 has a coil wire 77 connected to the distributor 38. A spark firing signal is picked up from the coil wire 77 by the lead wire 76, with the remaining operation of the system identical with that just described. The contents of the cabinet of FIG. 20 are identical with that shown in the dotted-line portion labeled cabinet in FIG. 19.

If the solid state ignition system is not of the type illustrated in FIG. 20, the lead wire 76 would be attached to the system in a suitable position to pick up a spark firing signal, and would use such signal in the manner previously described. Suitable changes in the control circuitry may be made if necessitated by the particular nature of the spark firing signal picked up.

There is thus provided an improved testing system for internal combustion engines whereby the objects of the present invention listed above and numerous additional advantages are attained.

I claim:

1. A method of revealing the average timing angle over all the cylinders of an internal combustion engine with reference to a single predetermined top dead center position, said engine including a distributor, a plurality of cylinders each having a piston, a spark plug, and a crankshaft connected to said piston; said method including measuring the time the engine takes to rotate two full and exact revolutions from top dead center to top dead center from said predetermined top dead center position, determining simultaneously with the measurement of the time taken by the engine to rotate said two revolutions the time of advance with reference to said top dead center position for each individual cylinder in the engine summing these time intervals for each individual cylinder, dividing the values so obtained by the number of cylinders in said engine, thereby obtaining an average time of advance, determining the time said engine takes to rotate one degree during said two revolutions, and dividing the average time value just obtained by the time the engine takes to rotate one degree, thereby obtaining the true average timing angle.

2. The method defined in claim 1, with said internal combustion engine being equipped with a solid state ignition system.

3. The method defined in claim 1, with the summation being obtained by measuring the time which the engine takes to rotate to the point of spark firing in each respective individual cylinder, said time being measured from the time of occurrence of the spark firing closest preceding the time the engine was last at a top dead center position, and subtracting from each individual time so recorded, the time since the engine was last at a top dead center position, thereby obtaining a true spark advance for each cylinder, and summing the values so obtained, thereby obtaining said summation.

4. The method defined in claim 1, with the time required for one degree of engine rotation being determined by producing electrical pulsations of a uniform frequency by means of an oscillator, counting the pulsations so produced by the oscillator during two revolutions of the engine, relating the number of pulsations so counted to the time elapsed, and dividing the elapsed time by 720 to determine said time for one degree of rotation.

5. The method as defined in claim 1, with the engine running in a retarded spark condition, measuring the time which the engine takes to rotate two full and exact revolutions from top dead center to top dead center, simultaneously measuring for each individual cylinder in said engine the time the engine takes to rotate from the moment the piston in each respective individual cylinder reaches its top dead center position to the time of occurrence of spark firing in the respective individual cylinder, summing the individual time intervals so obtained for each individual cylinder, dividing the value so obtained by the number of cylinders in said engine to obtain an average time, determining from the number of pulses just counted for two revolutions the time the engine takes for one degree of rotation, and dividing said average time just obtained by the time the engine takes to rotate one degree, thereby obtaining the true average timing angle over all the cylinders of said engine.

6. The method defined in claim 5, with said summation being obtained by measuring and recording for each individual cylinder in said engine the time the engine takes to rotate to the point of spark firing for each individual cylinder, said time being measured from the time of occurrence of the spark firing closest succeeding the time the engine was last at a top dead center position, and subtracting from each individual time so recorded the time since the engine last reached said top dead center position, thereby obtaining a true spark advance for each cylinder, and summing the values so obtained, thereby obtaining said summation.

7. The method defined in claim 5, with the time required for one degree of engine rotation being determined by producing electrical pulsations of a uniform frequency by means of an oscillator, counting the pulsations so produced by the oscillator during two revolutions of the engine, relating the number of pulsations so counted to the time elapsed, and dividing the elapsed time by 720 to determine said time for one degree of rotation.

8. A method of revealing the average timing angle over all the cylinders of an internal combustion engine with reference to a single predetermined top dead center position, said engine including a distributor, a plurality of cylinders each having a piston, a spark plug, and a crankshaft connected to said piston, said method including running or rotating the engine and producing, with the aid of an oscillator, voltage pulsations of a predetermined frequency, counting said pulsations for two full and exact revolutions of the engine from top dead center to top dead center from said predetermined top dead center position, determining simultaneously with the counting of pulsations for said two revolutions of the engine the timing advance for each individual cylinder in the engine with reference to said predetermined top dead center position by determining the difference between the number of pulsations occurring during the time the engine takes to rotate from the time of occurrence of the spark firing closest preceding the time the engine was last at a top dead center position to the spark firing in each individual cylinder being measured, and the number of pulsations occurring from the time the engine was last at a top dead center position until said spark firing, summing the count of pulses so obtained for each cylinder, dividing said sum by the number of individual cylinders in said engine, determining from the number of pulses just counted for two revolutions the number of pulses occurring during one degree of engine rotation, and dividing the number of pulses just obtained by said division by the number of pulses occurring during one degree of engine rotation, thereby determining the true average timing angle over all the cylinders in said internal combustion engine as related to said predetermined top dead center position.

9. The method as defined in claim 8, with said engine running in a retarded spark condition, said method including running or rotating the engine and producing, with the aid of an oscillator, voltage pulsations of a predetermined frequency, counting said pulsations for two full and exact revolutions of the engine from top dead center to top dead center from said predetermined top dead center position, determining simultaneously with the counting of pulsations for said two revolutions of the engine the timing advance for each individual cylinder in the engine with reference to said predetermined top dead center position by determining the difference between the number of pulsations occurring during the time the engine takes to rotate from the time of occurrence of the spark firing closest succeeding the time the engine was last at a top dead center position to the spark firing in each individual cylinder being measured, and the number of pulsations occurring from the time the engine was last at a top dead center position until said spark firing, summing the differences so recorded for each individual cylinder, dividing said sum by the number of individual cylinders in said engine, determining from the number of pulses just counted for two revolutions the number of pulses occurring during one degree of engine rotation, and dividing the number of pulses obtained by said division by the number of pulses occurring during one degree of engine rotation, thereby determining the true average timing angle over all the cylinders in said internal combustion engine as related to said predetermined top dead center position.

10. The method defined in claim 8, with the time required for one degree of engine rotation being determined by producing electrical pulsations of a fixed frequency by means of a crystal oscillator, counting the pulsations so produced by the crystal oscillator during two revolutions of the engine, relating the number of pulsations so counted to the time elapsed, and dividing the elapsed time by 720 to determine said time for one degree of rotation.

11. The method defined in claim 9, with the time required for one degree of engine rotation being determined by producing electrical pulsations of a fixed frequency by means of a crystal oscillator, counting the pulsations so produced by the crystal oscillator during two revolutions of the engine, relating the number of pulsations so counted to the time elapsed, and dividing the elapsed time by 720 to determine said time for one degree of rotation.

12. A method of revealing the timing angle of a V-8 internal combustion engine including a distributor, a coil, a plurality of cylinders each having a piston, a spark plug, and a crankshaft connected to said piston, said method including running or rotating the engine and producing with the aid of an oscillator, voltage pulsations of a predetermined frequency, producing with the aid of a magnetic pickup a signal each time the piston of a predetermined cylinder is at its top dead center position, counting said pulsations for two full and exact revolutions of the engine, beginning from a first top dead center signal and ending at a second subsequent top dead center signal, having said first top dead center signal simultaneously start a counting device to continuously count and record the number of pulsations being produced, recording the reading on such counting device each time a spark firing signal is produced, obtaining a summation of the eight values so obtained, multiplying said summation by the number ninety, dividing the result of such multiplication by the number of pulses counted for two full and exact revolutions of the engine, making the result of such division negative, and adding to the result of such division the number 225, thereby obtaining the true average timing angle of said engine in degrees.

13. A method of revealing the timing angle of a six cylinder internal combustion engine having a distributor, a coil, a plurality of cylinders each having a piston, a spark plug, and a crankshaft connected to said piston, said method including running or rotating the engine and producing with the aid of an oscillator, voltage pulsations of a predetermined frequency, producing with the aid of a magnetic pickup a signal each time the piston of a predetermined cylinder is at its top dead center position, counting said pulsations for two full and exact revolutions of the engine, beginning from a first top dead center signal and ending at a second subsequent top dead center signal, having said first top dead center signal simultaneously start a counting device to continuously count and record the number of pulsations being produced, recording the reading on such counting device each time a spark firing signal is produced, obtaining a summation of the six values so obtained, multiplying said summation by the number 120, dividing the result of such multiplication by the number of pulses counted for two full and exact revolutions of the engine, making the result of such division negative, and adding to the result of such division the number 240, thereby obtaining the true average timing angle of said engine in degrees.

14. A method of revealing the timing angle of a four cylinder internal combustion engine having a flat crankshaft and including a distributor, a coil, a plurality of cylinders each having a piston, a spark plug, and a crankshaft connected to said piston, said method including running or rotating the engine and producing with the aid of an oscillator, voltage pulsations of a predetermined frequency, producing with the aid of a magnetic pickup a signal each time the piston of a predetermined cylinder is at its top dead center position, counting said pulsations for two full and exact revolutions of the engine, beginning from a first top dead center signal and ending at a second subsequent top dead center signal, having said first top dead center signal simultaneously starting a counting device to continuously count and record the number of pulsations being produced, recording the reading on such counting device each time spark firing signal is produced, obtaining a summation of the four values so obtained, multiplying said summation by the number 180, dividing the result of such multiplication by the number of pulses counted for two full and exact revolutions of the engine, making the result of such division negative, and adding to the result of such division the number 270, thereby obtaining the true average timing angle of said engine in degrees.

15. A method of revealing the timing angle of a V-8 internal combustion engine running in the advanced spark condition including a distributor, a coil, a plurality of cylinders each having a piston, a spark plug, and a crankshaft connected to said piston, said method including running or rotating the engine and producing with the aid of an oscillator, voltage pulsations of a predetermined frequency, producing with the aid of a wire loop, coil, or clip around the coil wire, a signal each time a spark firing occurs within a cylinder of said V-8 engine, producing with the aid of a magnetic pickup a signal each time the piston of a predetermined cylinder of said engine is at its top dead center position, counting said pulsations for two full and exact revolutions of said engine beginning from a predetermined top dead center signal, continuing through a first subsequent top dead center signal and ending at a second subsequent top dead center signal, having said predetermined top dead center signal simultaneously start a counting device to continuously count and record the number of pulsations being produced since the occurrence of said predetermined top dead center signal, recording the reading on said device each time a spark firing signal is produced, thereby recording the number of pulses occurring for the first four spark firings, at said first subsequent top dead center signal turning on a second counting device to count and record the number of pulsations being produced, recording the reading on said second counting device each time a spark firing signal is produced and thereby obtain the number of pulses occurring between said spark firing and the last occurring top dead center pulse for each cylinder in said V-8 internal combustion engine, and subtracting each value so obtained from the time interval elapsed from the time of occurrence of the spark firing closest preceding the time the engine was last at a top dead center position, to the occurrence of the respective spark firing, thereby obtaining the spark advance of each cylinder in said engine, summing the individual count of pulses so obtained for each individual cylinder, dividing the value so obtained by the number of cylinders in said engine to obtain an average count of pulses, converting said count of pulses into a time value, determining the time the engine takes for one degree of rotation, and dividing said average time just obtained by the time the engine takes to rotate one degree, thereby obtaining the true average timing angle of all the cylinders of said engine.

16. The method defined in claim 15, with the time required for one degree of engine rotation being determined by producing electrical pulsations of a uniform frequency by means of an oscillator, counting the pulsations so produced by the oscillator during two revolutions of the engine, relating the number of pulsations so counted to the time elapsed, and dividing the elapsed time by 720 to determine said time for one degree of rotation.

17. A method of revealing the timing angle of a V-8 internal combustion engine running in the retarded spark condition and including a distributor, a coil, a plurality of cylinders each having a piston, a spark plug, and a crankshaft connected to said piston, said method including running or rotating the engine and producing with the aid of an oscillator, voltage pulsations of a predetermined frequency, producing with the aid of a wire loop, coil, or clip around the coil wire, a signal each time a spark firing occurs within a cylinder of said V-8 engine, producing with the aid of a magnetic pickup a signal each time a piston of a predetermined cylinder of said engine is at its top dead center position, counting said pulsations for two full and exact revolutions of said engine beginning from a predetermined top dead center signal and ending at a second subsequent top dead center signal, having said predetermined top dead center signal simultaneously start a counting device to continuously count and record the number of pulsations being produced since the occurrence of said predetermined top dead center signal, recording the reading on said device each time a spark firing signal is produced by a spark plug firing, thereby recording the number of pulses occurring for the first four spark firings, at said first subsequent top dead center signal turning on a second counting device to count and record the number of pulsations being produced, recording the reading on said second counting device each time a spark firing signal is produced, and thereby obtaining the number of pulses occurring between said spark firing and the last occurring top dead center pulse for each cylinder in said V-8 internal combustion engine, and subtracting each value so obtained from the interval elapsed from the time of occurrence of the spark firing closest succeeding the time the engine was last at a top dead center position to the occurrence of the respective spark firing, thereby obtaining the spark advance of each cylinder in said engine, summing the individual count of pulses so obtained for each individual cylinder, dividing the value so obtained by the number of cylinders in said engine to obtain an average count of pulses, converting said count of pulses into a time value, determining the time the engine takes for one degree of rotation, and dividing said average time just obtained by the time the engine takes to rotate one degree, thereby obtaining the true average timing angle over all the cylinders of said engine.

18. The method defined in claim 17, with the time required for one degree of engine rotation being determined by producing electrical pulsations of a uniform frequency by means of an oscillator, counting the pulsations so produced by the oscillator during two revolutions of the engine, relating the number of pulsations so counted to the time elapsed, and dividing the elapsed time by 720 to determine said time for one degree of rotation.

19. A device for measuring the average timing angle of a V-8 internal combustion engine, said device including an oscillator adapted to produce by means of a frequency divider, electrical pulsations of a uniform frequency, means to produce an electrical signal at the moment of spark occurrence for each individual cylinder in said engine, means to produce an electrical signal at the moment the piston of a predetermined cylinder reaches its top dead center position, means responsive to said electrical signal to begin a first count of said pulsations from the moment said piston reaches its top dead center position and continuing said first count through a first subsequent top dead center signal and ending at a second subsequent top dead center signal, thereby continuing said first count for two full and exact revolutions of said engine, a first counting means responsive to said top dead center signal to continuously count the number of pulsations being produced since the occurrence of said top dead center signal, means responsive to said spark firing signals to record the reading on said first counting means each time a spark firing signal is produced, a second counting means, means responsive to said first subsequent top dead center signal to turn on said second counting means, means responsive to said spark firing pulses to record the reading on said second counting means each time a spark firing signal is produced, and thereby obtaining the number of pulses occurring between said spark firing signal and the last occurring top dead center pulse for each individual cylinder in said internal combustion engine, means to obtain a summation of the values so obtained for each individual cylinder; means to multiply said summation by the number ninety and divide the result of such multiplication by the number of pulses counted for two full and exact revolutions of the engine, and means to subtract from the number 225 the result of such division, thereby obtaining the true average timing angle of said engine in degrees.

20. The device defined in claim 19, wherein said signal responsive means include signal conditioners to convert the electrical pulses into signals compatible with the system, a control unit connected to said signal conditioners to receive these signals, a timing binary counter and a second timing binary counter connected to said control unit, an RPM binary counter also connected to said control unit and a multiplying counter also connected to said control unit, a second register connected to said control unit, an arithmetic unit consisting of an adder and a register connected to said RPM and binary counters and receiving a signal from said multiplying counter, and a timing binary coded decimal counter connected to said arithmetic unit and adapted to count said pulses and store the result.

21. The device defined in claim 20 and including a display unit to give a visual read-out of the timing angle.

22. The device defined in claim 21, and including a selector switch connected to said control unit and adapted to select whether the timing angle will be calculated for one cylinder or over all the cylinders of said engine.

23. The device divided in claim 21 and including a selector switch connected to said control unit and adapted to select the number of cycles the timing angle will be calculated over.

24. The device defined in claim 23 and including a mode switch connected to the control unit and adapted to perform an internal test of the system.

25. The device defined in claim 20 and including an RPM binary coded decimal counter.

26. The device defined in claim 25 and including a display unit to give a visual readout of the RPM of the engine being tested.

27. The device defined in claim 26 and including a timing comparator to compare the calculated timing angle with a predetermined range of timing angles and display the results of the comparison.

28. The device defined in claim 27 and including an RPM comparator to compare the calculated RPM with a predetermined range of RPM and blank out the timing angle display if the RPM is not within the predetermined range.

29. The device defined in claim 28 and including a servo-mechanism connected to said timing angle comparator and adapted to adjust the distributor to produce a desired timing angle.

30. The device defined in claim 29 and adapted to find the timing angle of a V-8 internal combustion engine equipped with a solid state ignition system.

* * * * *